(12) United States Patent
Retailleau et al.

(10) Patent No.: US 12,122,928 B2
(45) Date of Patent: Oct. 22, 2024

(54) RADIATION CURABLE INKJET INK SETS

(71) Applicant: AGFA NV, Mortsel (BE)

(72) Inventors: Matthieu Retailleau, Mortsel (BE); Bart Waumans, Mortsel (BE)

(73) Assignee: Agfa NV, Mortsel (BE)

( * ) Notice: Subject to any disclaimer, the term of this patent is extended or adjusted under 35 U.S.C. 154(b) by 0 days.

(21) Appl. No.: 17/777,472

(22) PCT Filed: Nov. 6, 2020

(86) PCT No.: PCT/EP2020/081305
§ 371 (c)(1),
(2) Date: May 17, 2022

(87) PCT Pub. No.: WO2021/099145
PCT Pub. Date: May 27, 2021

(65) Prior Publication Data
US 2022/0403198 A1 Dec. 22, 2022

(30) Foreign Application Priority Data
Nov. 19, 2019 (EP) .................................... 19209996

(51) Int. Cl.
| | | |
|---|---|---|
| *C09D 11/40* | (2014.01) | |
| *B41M 7/00* | (2006.01) | |
| *C08J 7/18* | (2006.01) | |
| *C09D 11/037* | (2014.01) | |
| *C09D 11/101* | (2014.01) | |
| *C09D 11/107* | (2014.01) | |
| *C09D 11/322* | (2014.01) | |
| *C09D 11/38* | (2014.01) | |

(52) U.S. Cl.
CPC ............ *C09D 11/40* (2013.01); *B41M 7/0081* (2013.01); *C08J 7/18* (2013.01); *C09D 11/037* (2013.01); *C09D 11/101* (2013.01); *C09D 11/107* (2013.01); *C09D 11/322* (2013.01); *C09D 11/38* (2013.01); *C08J 2323/12* (2013.01); *C08J 2333/12* (2013.01); *C08J 2433/08* (2013.01); *C08J 2433/14* (2013.01)

(58) Field of Classification Search
CPC ............ B41M 7/0081; B41M 2323/12; B41M 2333/12; B41M 2433/14; C08J 7/18; C09D 11/037; C09D 11/101; C09D 11/107; C09D 11/322; C09D 11/38; C09D 11/40
See application file for complete search history.

(56) References Cited

U.S. PATENT DOCUMENTS

| | | |
|---|---|---|
| 6,814,791 B2 | 11/2004 | Moore et al. |
| 2010/0233448 A1 | 9/2010 | Kameyama et al. |
| 2015/0064398 A1 | 3/2015 | Umebayashi |
| 2017/0313894 A1 | 11/2017 | Ward et al. |
| 2019/0144697 A1 | 5/2019 | Saito |
| 2020/0254755 A1 | 8/2020 | Nakano et al. |

FOREIGN PATENT DOCUMENTS

| | | |
|---|---|---|
| EP | 2228416 A1 | 9/2010 |
| EP | 2546313 A1 | 1/2013 |
| EP | 3243666 A1 | 11/2017 |
| EP | 3628707 A2 | 4/2020 |
| WO | WO 2012/075146 A1 | 6/2012 |

OTHER PUBLICATIONS

European Patent Office, International Search Report in International Patent Application No. PCT/EP2020/081305, mailed May 18, 2021, 4 pp.
European Patent Office, Written Opinion in International Patent Application No. PCT/EP2020/081305, mailed May 18, 2021, 7 pp.

*Primary Examiner* — Christopher M Polley
*Assistant Examiner* — Sathavaram I Reddy
(74) *Attorney, Agent, or Firm* — Leydig, Voit & Mayer, Ltd.

(57) ABSTRACT

A radiation curable inkjet ink set comprising a cyan inkjet ink containing a beta-copper phthalocyanine pigment and a polymerizable composition; a magenta inkjet ink containing a magenta or red pigment and a polymerizable composition; a yellow inkjet ink containing a yellow pigment and a polymerizable composition; and a black inkjet ink containing a carbon black pigment and a polymerizable composition; wherein the polymerizable compositions of the cyan, magenta, yellow and black inkjet inks include on average: a) 20.0 to 40.0 wt % of phenoxyethyl acrylate; b) 23.0 to 32.0 wt % of isobornyl acrylate; c) 1.0 to 14.4 wt % of monomer selected from the group consisting of 4-acryloylmorpholine and a monomer according to Formula (I), wherein X represents C or O, n represents 1, 2 or 3 and m represents 0 or 1; and d) up to 14.0 wt % of a multifunctional monomer or oligomer; wherein all weight percentages (wt %) are based upon the total weight of the inkjet ink; and wherein 0, 1 or 2 of the cyan, magenta, yellow and black inkjet inks deviate in a range a) to d) and this deviation is no more than 1.0 wt %.

(I)

14 Claims, No Drawings

RADIATION CURABLE INKJET INK SETS

CROSS-REFERENCE TO RELATED APPLICATIONS

This patent application is the U.S. national phase of copending International Patent Application No. PCT/EP2020/081305, filed Nov. 6, 2020, which claims the benefit of European Patent Application No. 19209996.8, filed Nov. 19, 2019.

TECHNICAL FIELD

The present invention relates to radiation curable inkjet ink sets for printing multi-colour images exhibiting good adhesion on a wide range of non-absorbing substrates, including both polypropylene (PP) and polymethylmethacrylate (PMMA) substrates.

BACKGROUND ART

The behaviour and interaction of a radiation curable inkjet ink on a substantially non-absorbing ink-receiver has found to be quite complicated compared to water-based inks on absorbent ink-receivers. In particular, adhesion problems were observed when using different types of non-absorbing ink-receivers.

One way to approach these problems is to develop and use different ink sets for different types of substrates, but this is not a preferred solution since changing inks in the printer and print heads is very time consuming and not really a viable solution for an industrial printing environment.

Adhesion is influenced by using different polymerizable compounds, surfactants, binders and organic solvents. U.S. Pat. No. 6,814,791 (DOMINO PRINTING SCIENCES) discloses inkjet printing methods for printing on polypropylene substrates, wherein the ink composition comprises methyl acetate (boiling point 57° C.) as a solvent. The use of a well-chosen solvent results in partial swelling or dissolution of the substrate surface, which leads to better adhesion. However, this also may generate problems of blocked nozzles in print heads due to evaporation of the solvent, which is also unacceptable for an industrial printing environment.

Adhesion of radiation curable inks can also be promoted by using specific monomers. For example, adhesion can be improved on polyvinyl chloride (PVC) substrates by using monomers, like tetrahydrofurfuryl acrylate and N-vinyl caprolactam, for the swelling of the PVC substrate. However, adhesion on polycarbonate (PC) substrates is promoted by using different monomers, such as 2-phenoxyethyl acrylate, 2-(2-ethoxyethoxy)ethyl acrylate and polyethyleneglycol diacrylate. As a consequence, it is attempted to make a "best possible" mixture of monomers suitable for multiple substrates. Often such a compromise has a negative effect on other ink properties, such as the dispersion stability of a pigmented inkjet ink, curing sensitivity and stickiness of the printed substrate. As a result, the "best possible" mixture of monomers has to be adapted for inkjet inks of different colour.

The use of isobornyl acrylate and N-vinyl caprolactam in combination with other monofunctional monomers has been suggested for adhesion to multiple substrates, including polypropylene and acrylic resin substrates. For example, EP 2228416 A (TOYO) discloses an active energy ray-curable ink composition having excellent adhesiveness to various substrates and satisfactory ejection stability. The ink composition comprises 70 to 98% by weight of monofunctional monomers, wherein the monofunctional monomers include 25 to 65% by weight of isobornyl acrylate and 12.5 to 60% by weight of N-vinyl caprolactam.

Cured layers of inkjet ink containing high amounts of monofunctional monomers often tend to have issues with surface cure, which leads to stickiness issues when stacking printed samples on each other. Stickiness of ink towards a next printed sample on top should be low enough in order not to damage the back of the next printed sheet, or to damage the ink layer on the first printed sheet. Some like WO 2012/075146 A (EFI), that discloses a radiation curable ink composition having improved adhesion on PVC, PP and PC substrates, suggests to use tetrahydrofurfuryl acrylate (THFA), which is known to have good surface cure. However, THFA is also known for poor jetting reliability as it easily evaporates from print head nozzles. Printing heads in an inkjet printer usually operate at temperatures between 35 to 45° C. It was found that a vessel of THFA kept at 40° C. for 100 hours loses 40% of its weight.

EP 2546313 A (FUJIFILM) discloses an inkjet composition having good adhesion to PVC, acrylic resin and aluminum substrates. The ink composition comprises 1 to 35 wt % of diethylene glycol monobutyl ether acrylate in combination with other monomers such as phenoxyethyl acrylate, isobornyl acrylate, 3,3,5-trimethylcyclohexyl acrylate, 4-t-butyicyclohexyl acrylate, N-vinyllactam and tetrahydrofurfuryl acrylate.

A need continues to exist for radiation curable inkjet ink sets exhibiting good adhesion to multiple substrates, especially including both PP and PMMA substrates, while maintaining good curing speed and no stickiness issues with the printed substrate.

SUMMARY OF INVENTION

In order to overcome the problems described above, preferred embodiments of the present invention have been realized with a radiation curable inkjet ink set as defined in claim 1.

Inkjet inks need to be adapted in an ink set because, for example, different pigment concentrations are necessary or the absorbance of the pigment interferes with the photoinitiating system, especially when UV LED curing is used. It was found that by keeping the specific monomers and oligomers of the different inkjet inks, on average, within certain narrow ranges that optimal adhesion could be obtained on a multitude of substrates, including PP and PMMA which is regarded as difficult to achieve.

Sometimes improved adhesion is found for an ink set, as all radiation curable inkjet inks after curing stick well to different substrates, but the surface of the cured ink layer remains sticky. In the present invention, a combination of good result for adhesion in combination with good results for stickiness was obtained.

It should also be noticed that the improved adhesion and stickiness was achieved without using low-boiling point organic solvents or THFA, thus resulting in a good jetting reliability, which is essential in an industrial environment.

These and other objectives will become apparent from the detailed description hereinafter.

DESCRIPTION OF EMBODIMENTS

Definitions

The term "radiation curable", as used in radiation curable inkjet ink means that the inkjet ink is curable by actinic radiation, such as UV radiation and e-beam, preferably UV radiation. The latter inkjet inks are also referred to as UV curable inkjet inks.

The term "monofunctional", as used in monofunctional polymerizable compounds means polymerizable compounds containing a single polymerizable group.

The term "multifunctional", as used in multifunctional polymerizable compounds means polymerizable compounds containing two, three or more polymerizable groups.

The term "alkyl" means all variants possible for each number of carbon atoms in the alkyl group i.e. methyl, ethyl, for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethyl-propyl and 2-methyl-butyl, etc. This applies in a similar manner also to alkenyl, alkynyl, alkaryl and aralkyl groups.

The term "substituted", in e.g. substituted alkyl group means that the alkyl group may be substituted by other atoms than the atoms normally present in such a group, i.e. carbon and hydrogen. For example, a substituted alkyl group may include a halogen atom or a thiol group. An unsubstituted alkyl group contains only carbon and hydrogen atoms.

Unless otherwise specified a substituted alkyl group, a substituted alkenyl group, a substituted alkynyl group, a substituted aralkyl group, a substituted alkaryl group, a substituted aryl and a substituted heteroaryl group are preferably substituted by one or more constituents selected from the group consisting of ester, amide, ether, thioether, ketone, aldehyde, sulfoxide, sulfone, sulfonate ester, sulphonamide, —Cl, —Br, —I, —OH, —SH, —CN and —NO$_2$.

Unless otherwise specified a substituted or unsubstituted alkyl group is preferably a $C_1$ to $C_6$-alkyl group.

Unless otherwise specified a substituted or unsubstituted alkenyl group is preferably a $C_2$ to $C_6$-alkenyl group.

Unless otherwise specified a substituted or unsubstituted alkynyl group is preferably a $C_2$ to $C_6$-alkynyl group.

Unless otherwise specified a substituted or unsubstituted aralkyl group is preferably a phenyl or naphthyl group including one, two, three or more $C_1$ to $C_6$-alkyl groups.

Unless otherwise specified a substituted or unsubstituted alkaryl group is preferably a $C_7$ to $C_{25}$-alkyl group including a phenyl group or a naphthyl group.

A cyclic group includes at least one ring structure and may be a monocyclic- or polycyclic group, the latter meaning one or more rings fused together.

A heterocyclic group is a cyclic group that has atoms of at least two different elements as members of its ring(s). The counterparts of heterocyclic groups are homocyclic groups, the ring structures of which are made of carbon only. Unless otherwise specified a substituted or unsubstituted heterocyclic group is preferably a five- or six-membered ring substituted by one, two, three or four heteroatoms, preferably selected from oxygen atoms, nitrogen atoms, sulfur atoms, selenium atoms or combinations thereof.

An alicyclic group is a non-aromatic homocyclic group wherein the ring atoms consist of carbon atoms.

The term heteroaryl group means a monocyclic- or polycyclic aromatic ring comprising carbon atoms and one or more heteroatoms in the ring structure, preferably, 1 to 4 heteroatoms, independently selected from nitrogen, oxygen, selenium and sulphur. Preferred examples of heteroaryl groups include, but are not limited to, pyridinyl, pyridazinyl, pyrimidyl, pyrazyl, triazinyl, pyrrolyl, pyrazolyl, imidazolyl, (1,2,3,)- and (1,2,4)-triazolyl, pyrazinyl, pyrimidinyl, tetrazolyl, furyl, thienyl, isoxazolyl, thiazolyl, isoxazolyl, and oxazolyl. A heteroaryl group can be unsubstituted or substituted with one, two or more suitable substituents.

Preferably, a heteroaryl group is a monocyclic ring, wherein the ring comprises 1 to 5 carbon atoms and 1 to 4 heteroatoms. More preferably a substituted or unsubstituted heteroaryl group is preferably a five- or six-membered ring substituted by one, two or three oxygen atoms, nitrogen atoms, sulphur atoms, selenium atoms or combinations thereof.

Unless otherwise specified an unsubstituted aryl group is preferably a phenyl group or naphthyl group.

Unless otherwise specified an acyl group is preferably a —C(=O)—R group wherein R is selected from the group consisting of an optionally substituted alkyl group, an optionally substituted aryl group, an optionally substituted heteroaryl group, an optionally substituted alkenyl group, an optionally substituted alkynyl group, an optionally substituted alkaryl group and an optionally substituted aralkyl group.

(Meth)acrylate is intended herein to have its standard meaning, i.e. acrylate and/or methacrylate Radiation Curable Inkjet Ink Sets In a preferred embodiment of the invention, the radiation curable inkjet ink set comprises a cyan inkjet ink containing a beta-copper phthalocyanine pigment and a polymerizable composition; a magenta inkjet ink containing a magenta or red pigment and a polymerizable composition; a yellow inkjet ink containing a yellow pigment and a polymerizable composition; and a black inkjet ink containing a carbon black pigment and a polymerizable composition; wherein the polymerizable compositions of the cyan, magenta, yellow and black inkjet inks include on average: a) 20.0 to 40.0 wt %, preferably 30.0 to 38.0 wt % of phenoxyethyl acrylate; b) 23.0 to 32.0 wt % of isobornyl acrylate; c) 1.0 to 14.4 wt % of monomer selected from the group consisting of 4-acryloylmorpholine and a monomer according to Formula (I):

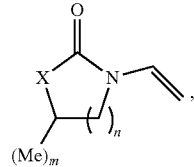

Formula (I)

wherein X represents C or O, n represents 1, 2 or 3 and m represents 0 or 1; and d) up to 14.0 wt % of a multifunctional monomer or oligomer; wherein all weight percentages (wt %) are based upon the total weight of the inkjet ink; and wherein 0, 1 or 2 of the cyan, magenta, yellow and black inkjet inks deviate in a range a) to d) and this deviation is no more than 1.0 wt %.

The concept "on average" has the normal mathematical meaning. For example, if the cyan, magenta, yellow and black inkjet inks contain respectively 30.6 wt %, 29.4 wt %, 29.5 wt % and 30.5 wt % of isobornylacrylate, then on average the ink set contains 30.0 wt % of isobornylacrylate.

In a preferred embodiment, the polymerizable compositions contain 4.0 to 9.0 wt % of a multifunctional monomer or oligomer for achieving improved stickiness.

In a preferred embodiment, the polymerizable compositions contain 24.0 to 27.0 wt % of isobornyl acrylate for obtaining improved stickiness.

In a preferred embodiment, the polymerizable compositions contain 33.0 to 38.0 wt % of phenoxyethyl acrylate and 25.0 to 31.5 wt % of isobornyl acrylate for achieving improved adhesion and stickiness.

In a preferred embodiment, the polymerizable compositions contain 7.0 to 14.0 wt %, more preferably 10.5 to 13.3 wt % of a monomer according to Formula (I) for achieving improved stickiness.

In a preferred embodiment, the polymerizable compositions contain no more than 15 wt %, preferably no more than 10 wt % and more preferably 0 to 5 wt % of other polymerizable compounds than those mentioned in a to d), all based upon the total weight of the inkjet ink.

In a preferred embodiment, the monomer according to Formula (I) is N-vinyl caprolactam or N-vinyl methyl oxazolidinone.

In a preferred embodiment, the cyan, magenta, yellow and black inkjet inks do not include 4-acryloylmorpholine.

In a preferred embodiment, the cyan, magenta, yellow and black inkjet inks include one or more polymerization initiators selected from the group consisting of an acylphosphine oxide compound, a thioxanthone compound and an α-hydroxy ketone compound for achieving good UV LED curing with UV LEDs in the range of 360 to 420 nm.

In a particularly preferred embodiment, the polymerization initiator includes at least 5.0 wt % of an acylphosphine oxide compound based on the total weight of the inkjet ink, for achieving high curing speed with UV LED curing In another particularly preferred embodiment, the cyan and/or magenta inkjet include 0 to 5.0 wt % preferably 0 to 3.0 wt % of a thioxanthone compound based on the total weight of the inkjet ink for achieving good colour gamut. Yellow degradation products of thioxanthone photoinitiators reduce the colour gamut. For example, a cyan ink at low ink coverage produces a more greenish colour instead of the desired cyan colour. The more greenish colour would normally be produced by a combination of cyan and yellow ink.

The radiation curable inkjet ink set of the invention may include additional inkjet inks, such as a radiation curable white inkjet ink for enhancing colour vibrancy. This inkjet ink set may also be extended with additional inks such as violet, green, blue or orange to further enlarge the colour gamut of the image. The radiation curable inkjet ink set may also be extended by the combination of full density inkjet inks with light density inkjet inks. The combination of dark and light colour inks and/or black and grey inks improves the image quality by a lowered graininess. The additional inkjet inks preferably have a polymerizable composition falling within the ranges of a) to d).

In a preferred embodiment, the radiation curable inkjet ink contains an organic colour pigment preferably in an amount of 0.1 to 13.0 wt %, more preferably 1.0 to 10.0 wt % and most preferably 2.0 to 8.0 wt based on the total weight of the radiation curable inkjet ink. In the above ranges the colour gamut is maximized.

For light density colour inkjet inks, the organic colour pigment is preferably present in an amount of 0.1 to 1.0 wt %, preferably 0.2 to 0.9 wt %, more preferably 0.3 to 0.5 wt %, based on the total weight of the radiation curable inkjet ink. In the above ranges the graininess in a printed image is minimized.

The radiation curable inkjet ink preferably includes 60 to 95 wt % of polymerizable compounds, more preferably 70 to 90 wt % of polymerizable compounds based upon the total weight of the radiation curable inkjet ink. An additional varnish inkjet ink may include up to 99 wt % of polymerizable compounds based upon the total weight of the radiation curable inkjet ink.

For having a good ejecting ability, the viscosity of the radiation curable inkjet ink at the jetting temperature is preferably smaller than 30.0 mPa·s, more preferably smaller than 20.0 mPa·s, most preferably between 5.0 and 16.0 mPa·s or even between 8.0 and 15.0 mPa·s at a shear rate of 1000 s$^{-1}$ and a jetting temperature between 30 and 70° C., preferably at a temperature of 45° C. Such viscosity allows for reliable inkjet printing.

The surface tension of the radiation curable inkjet ink is preferably in the range of 20 mN/m to 35 mN/m at 25° C., more preferably in the range of about 22 mN/m to about 30 mN/m at 25° C. In these ranges, good ink spreading is obtained on a wide range of substrates.

The radiation curable inkjet ink may further also contain at least one polymerization inhibitor for improving the thermal stability of the ink.

The radiation curable inkjet ink may further also contain at least one surfactant for obtaining good spreading characteristics on a substrate.

There is no limitation on combining the above preferred embodiments with each other.

Multifunctional Monomers and Oligomers

Multifunctional monomers and oligomers have two, three or more polymerizable groups Preferred multifunctional acrylates include vinylether acrylates (preferably 2-(2-vinyloxyethoxy)ethyl acrylate), triethylene glycol diacrylate, tetraethylene glycol diacrylate, polyethylene glycol diacrylate, dipropylene glycol diacrylate, tripropylene glycol diacrylate, polypropylene glycol diacrylate, 1,4-butanediol diacrylate, 1,6-hexanediol diacrylate, 1,9-nonanediol diacrylate, neopentyl glycol diacrylate, dimethyloltricyclodecane diacrylate, bisphenol A EO (ethylene oxide) adduct diacrylate, bisphenol A PO (propylene oxide) adduct diacrylate, hydroxypivalate neopentyl glycol diacrylate, propoxylated neopentyl glycol diacrylate, alkoxylated dimethyloltricyclodecane diacrylate and polytetramethylene glycol diacrylate, trimethylolpropane triacrylate, EO modified trimethylolpropane triacrylate, tri (propylene glycol) triacrylate, caprolactone modified trimethylolpropane triacrylate, pentaerythritol triacrylate, pentaerithritol tetraacrylate, pentaerythritolethoxy tetraacrylate, dipentaerythritol hexaacrylate, ditrimethylolpropane tetraacrylate glycerinpropoxy triacrylate, and caprolactam modified dipentaerythritol hexaacrylate.

Other preferred difunctional acrylates include alkoxylated cyclohexanone dimethanol diacrylate, alkoxylated hexanediol diacrylate, dioxane glycol diacrylate, dioxane glycol diacrylate, cyclohexanone dimethanol diacrylate, diethylene glycol diacrylate and neopentyl glycol diacrylate.

The multifunctional monomers are preferably difunctional as it was observed that further improved adhesion could generally be achieved by using only or substantially difunctional monomers and oligomers. Suitable trifunctional acrylates include propoxylated glycerine triacrylate and propoxylated trimethylolpropane triacrylate. Other higher functional acrylates include di-trimethylolpropane tetraacrylate, dipentaerythritol pentaacrylate, ethoxylated pentaeryhtritol tetraacrylate, methoxylated glycol acrylates and acrylate esters.

Preferred polymerizable oligomers epoxy acrylates, aliphatic urethane acrylates, aromatic urethane acrylates, polyester acrylates, and straight-chained acrylic oligomers.

Other Polymerizable Compounds

The radiation curable inkjet inks may include other polymerizable compounds than those mentioned in a) to d) for the polymerizable compositions of the ink set of the invention. Any other monomer and oligomer having a single polymerizable group capable of free radical polymerization may be used in the radiation curable inkjet inks.

Suitable monofunctional acrylate monomers include isoamyl acrylate, stearyl acrylate, lauryl acrylate, octyl acrylate, decyl acrylate, isoamylstyl acrylate, isostearyl acrylate, 2-ethylhexyl-diglycol acrylate, 2-hydroxybutyl acrylate, 2-acryloyloxyethylhexahydrophthalic acid, butoxyethyl acrylate, ethoxydiethylene glycol acrylate, methoxydiethylene glycol acrylate, methoxypolyethylene glycol acrylate, methoxypropylene glycol acrylate, tetrahydrofurfuryl acrylate, 2-hydroxyethyl acrylate, 2-hydroxypropyl acrylate, 2-hydroxy-3-phenoxypropyl acrylate, vinyl ether acrylate, 2-acryloyloxyethylsuccinic acid, 2-acryloxyethylphthalic acid, 2-acryloxyethyl-2-hydroxyethyl-phthalic acid, lactone modified flexible acrylate, and t-butylcyclohexyl acrylate.

Other suitable monofunctional acrylates include caprolactone acrylate, cyclic trimethylolpropane formal acrylate, ethoxylated nonyl phenol acrylate, isodecyl acrylate, isooctyl acrylate, octyldecyl acrylate, alkoxylated phenol acrylate, tridecyl acrylate and alkoxylated cyclohexanone dimethanol diacrylate.

Furthermore, methacrylates corresponding to the above-mentioned acrylates may be used with these acrylates. However, preferably acrylates are used instead of methacrylates for achieving high curing speed. Of the methacrylates, methoxypolyethylene glycol methacrylate, methoxytriethylene glycol methacrylate, hydroxyethyl methacrylate, phenoxyethyl methacrylate, cyclohexyl methacrylate, tetraethylene glycol dimethacrylate, and polyethylene glycol dimethacrylate are preferred due to their relatively high sensitivity and high adhesion to a substrate.

Photoinitiators and Co-Initiators

The radiation curable inkjet inks preferably also contain a photoinitiator. A photoinitiator requires less energy to activate than the polymerizable compounds for forming a polymer. If the inkjet ink contains no initiator, it can be cured by electron beam curing.

The radiation curable inkjet inks preferably contain one or more photoinitiators that initiate polymerization of monomers and oligomers when exposed to actinic radiation by the formation of a free radical. Two types of radical photoinitiators can be distinguished. A Norrish Type I initiator is an initiator which cleaves after excitation, yielding the initiating radical immediately. A Norrish type II-initiator is a photoinitiator which is activated by actinic radiation and forms free radicals by hydrogen abstraction from a second compound that becomes the actual initiating free radical. This second compound is called a polymerization synergist or co-initiator. Both type I and type II photoinitiators can be used in the present invention, alone or in combination.

The radiation curable inkjet inks preferably contain a photoinitiating system comprising one or more photoinitiators and one or more co-initiators instead of a single photoinitiator.

Suitable photo-initiators are disclosed in CRIVELLO, J. V., et al. VOLUME III: Photoinitiators for Free Radical Cationic polymerization. 2nd edition. Edited by BRADLEY, G. London, UK: John Wiley and Sons Ltd, 1998. p. 287-294.

For achieving good UV LED curing with UV LEDs in the range of 360 to 420 nm, the radiation curable inkjet inks preferably include one or more polymerization initiators selected from the group consisting of an acylphosphine oxide compound, a thioxanthone compound and an α-hydroxy ketone compound.

In a preferred embodiment, the photoinitiator in the radiation curable inkjet ink includes one or more acylphosphine oxides. Preferred acylphosphine oxide photoinitiators include 2,4,6-trimethylbenzoyl-diphenyl-phosphine oxide available as a Darocur™ TPO (manufactured by BASF); and bis(2,4,6-trimethylbenzoyl)-phenyl phosphine oxide available as Irgacure™ 819 (manufactured by BASF). A particularly preferred acylphosphine-oxide is ethyl(2,4,6-trimethylbenzoyl)-phenyl phosphinate (CAS No 84434-11-7), commercially available as Omnirad™ TPO-L from IGM.

In a particularly preferred embodiment, the polymerization initiator includes at least 5.0 wt % of an acylphosphine oxide compound based on the total weight of the inkjet ink, for achieving high curing speed with UV LED curing. The 5.0 wt % preferably comprises one or more of the acylphosphine oxides mentioned in the previous paragraph.

Specific examples of photo-initiators inkjet inks may include, but are not limited to, the following compounds or combinations thereof: benzophenone and substituted benzophenones, 1-hydroxycyclohexyl phenyl ketone, thioxanthones such as isopropylthioxanthone, 2-hydroxy-2-methyl-1-phenylpropan-1-one, 2-benzyl-2-dimethylamino-(4-morpholinophenyl) butan-1-one, benzil dimethylketal, bis(2,6-dimethylbenzoyl)-2,4,4-trimethylpentylphosphine oxide, 2,4,6 trimethylbenzoyldiphenylphosphine oxide, 2-methyl-1-[4-(methylthio) phenyl]-2-morpholinopropan-1-one, 2,2-dimethoxy-1,2-diphenylethan-1-one or 5,7-diiodo-3-butoxy-6-fluorone.

Suitable commercial photo-initiators include Irgacure™ 184, Irgacure™ 500, Irgacure™ 907, Irgacure™ 369, Irgacure™ 1700, Irgacure™ 651, Irgacure™ 819, Irgacure™ 1000, Irgacure™ 1300, Irgacure™ 1870, Darocur™ 1173, Darocur™ 2959, Darocur™ 4265 and Darocur™ ITX, Lucerin™ TPO, all available from BASF, Esacure™ KT046, Esacure™ KIP150, Esacure™ KT37 and Esacure™ EDB available from LAMBERTI, H-Nu™ 470 and H-Nu™ 470X available from SPECTRA GROUP Ltd.

In order to increase the photosensitivity further, the UV curable inkjet inks may additionally contain co-initiators. Suitable examples of amine co-initiators can be categorized in three groups:
 (1) tertiary aliphatic amines such as methyldiethanolamine, dimethylethanolamine, triethanolamine, triethylamine and N-methylmorpholine;
 (2) aromatic amines such as amylparadimethylaminobenzoate, 2-n-butoxyethyl-4-(dimethylamino) benzoate, 2-(dimethylamino)ethylbenzoate, ethyl-4-(dimethylamino)benzoate, and 2-ethylhexyl-4-(dimethylamino) benzoate; and
 (3) (meth)acrylated amines such as dialkylamino alkyl (meth)acrylates (e.g., diethylaminoethylacrylate) or N-morpholinoalkyl-(meth)acrylates (e.g., N-morpholinoethyl-acrylate).

The preferred co-initiators are aminobenzoates.

The photoinitiator may be a polymerizable photoinitiator, including one or more polymerizable groups, preferably acrylate groups.

The co-initiator may be a polymerizable co-initiator, including one or more polymerizable groups, preferably acrylate groups A preferred amount of photoinitiator is 0.5 to 20 wt %, more preferably 3.0 to 10 wt % of the total weight of the UV curable inkjet ink.

The UV curable inkjet ink preferably comprises the co-initiator in an amount of 0.1 to 20 wt %, more preferably in an amount of 0.5 to 15 wt %, most preferably in an amount of 1 to 10 wt % of the total weight of the UV curable inkjet ink.

Colorants

With the exception of an optional varnish or primer, the radiation curable inkjet inks in the ink set of the invention contain a colorant. Preferably only colour pigments are used as colorants, because of their superior light fading properties compared to dyes. Colour pigments may be organic or inorganic pigments. Preferred colour pigments are chosen from those disclosed by HERBST, Willy, et al. Industrial Organic Pigments, Production, Properties, Applications. 3rd edition. Wiley—VCH, 2004. ISBN 3527305769.

The cyan inkjet ink contains a beta-copper phthalocyanine pigment, such as C.I. Pigment Blue 15:3 and particularly preferably C.I. Pigment Blue 15:4 for reasons of good dispersion stability. It was found that these beta-copper phthalocyanine pigment exhibited the best light fastness compared to other cyan pigments.

The black inkjet ink contains a carbon black pigment for achieving good blackness at low cost. Suitable carbon blacks include Carbon Black MA8® from MITSUBISHI CHEMICAL, Regal® 400R, Mogul® L, Elftex® 320 from CABOT Co., or Carbon Black FW18, Special Black 250, Special Black 350, Special Black 550, Printex® 25, Printex® 35, Printex® 55, Printex® 90, Printex® 150T from DEGUSSA. In a preferred embodiment, the carbon black pigment used is a pigment having less than 0.15% of toluene-extractable fraction using the method as described in section III, paragraph 5 of the Resolution AP(89) 1 dated 13 Sep. 1989 published by the Council of Europe.

The yellow inkjet ink contains a yellow pigment. Suitable yellow pigments are C.I. Pigment Yellow 1, 3, 10, 12, 13, 14, 17, 55, 65, 73, 74, 75, 83, 93, 97, 109, 111, 120, 128, 138, 139, 150, 151, 154, 155, 175, 180, 181, 185, 194 and 213.

However, for maximizing colour gamut and especially light fastness, preferably the yellow pigment is selected from the group consisting of C.I. Pigment Yellow 120, 138, 139, 150, 155, 185 and 213 and mixed crystals thereof. If possible health risks exist in the printing application, then C.I. Pigment Yellow 150 is not used as it contains nickel. The most preferred yellow pigment is C.I. Pigment Yellow 155 as it combines very high colour gamut and lightfastness.

The magenta inkjet ink contains a magenta or red pigment selected from the group consisting of a quinacridone, a diketopyrrolopyrrole pigment and mixed crystals or mixtures thereof. A particular preferred pigment is C.I. Pigment Red 122, C.I. Pigment red 202, 0.1 Pigment Violet 19, C.I. Pigment Red 254 and mixed crystals thereof.

For additional colour inkjet inks other suitable colour pigments may be used.

Suitable violet pigments are C.I. Pigment Violet 19, 23, 32, and 37.

Suitable orange pigments are C.I. Pigment Orange 5, 13, 16, 34, 40, 43, 59, 66, 67, 69, 71 and 73.

Suitable green pigments are C.I. Pigment Green 7 and 36.

Suitable brown pigments are C.I. Pigment Brown 6 and 7.

A mixed crystal is also referred to as solid solution. For example, under certain conditions different quinacridones mix with each other to form solid solutions, which are quite different from both physical mixtures of the compounds and from the compounds themselves. In a solid solution, the molecules of the components enter into the same crystal lattice, usually, but not always, that of one of the components. The x-ray diffraction pattern of the resulting crystalline solid is characteristic of that solid and can be clearly differentiated from the pattern of a physical mixture of the same components in the same proportion. In such physical mixtures, the x-ray pattern of each of the components can be distinguished, and the disappearance of many of these lines is one of the criteria of the formation of solid solutions. A commercially available example is Cinquasia™ Magenta RT-355-D from BASF AG.

It is also possible to make mixtures of pigments. For example, in some inkjet ink application a neutral black inkjet ink is preferred and can be obtained e.g. by mixing a black pigment and a cyan pigment into the ink. Also pigments may be combined to enlarge the colour gamut of an ink set. The inkjet ink set may also include one or more spot colours. Silver and gold are often desired colours for making a product more attractive by giving it an exclusive appearance.

Also non-organic pigments may be present in the inks. Suitable pigments are C.I. Pigment Metal 1, 2 and 3. Illustrative examples of the inorganic pigments include titanium oxide, barium sulfate, calcium carbonate, zinc oxide, lead sulfate, yellow lead, zinc yellow, red iron oxide (III), cadmium red, ultramarine blue, prussian blue, chromium oxide green, cobalt green, amber, titanium black and synthetic iron black. However, care should be taken to prevent migration and extraction of heavy metals in e.g. food packaging applications. Preferably no pigments are used which contain a heavy metal selected from the group consisting of arsenic, lead, mercury and cadmium. In a more preferred embodiment, no inorganic pigments are used in the inkjet ink with the exception of titanium oxide or calcium carbonate for the optional white inkjet ink.

Pigment particles in inkjet ink should be sufficiently small to permit free flow of the ink through the inkjet-printing device, especially at the ejecting nozzles. It is also desirable to use small particles for maximum colour strength and to slow down sedimentation.

The numeric average pigment particle size is preferably between 0.050 and 1 µm, more preferably between 0.070 and 0.300 µm and particularly preferably between 0.080 and 0.200 µm. Most preferably, the numeric average pigment particle size is no larger than 0.150 µm. An average particle size smaller than 0.050 µm is less desirable for decreased lightfastness, but mainly also because very small pigment particles or individual pigment molecules thereof may still be extracted in food packaging applications.

In the case of a white inkjet ink, preferably a pigment with a refractive index greater than 1.60, preferably greater than 2.00, more preferably greater than 2.50 and most preferably greater than 2.60 is used. The white pigments may be employed singly or in combination.

Preferably titanium dioxide is used for the pigment with a refractive index greater than 1.60. Titanium oxide occurs in the crystalline forms of anatase type, rutile type and brookite type. The anatase type has a relatively low density and is easily ground into fine particles, while the rutile type has a relatively high refractive index, exhibiting a high covering power. Either one of these is usable in this invention. It is preferred to make the most possible use of characteristics and to make selections according to the use thereof. The use of the anatase type having a low density and a small particle size can achieve superior dispersion stability, ink storage stability and ejectability. At least two different crystalline forms may be used in combination. The combined use of the anatase type and the rutile type which exhibits a high colouring power can reduce the total amount of titanium oxide, leading to improved storage stability and ejection performance of ink.

For surface treatment of the titanium oxide, an aqueous treatment or a gas phase treatment is applied, and an alumina-silica treating agent is usually employed. Untreated-, alumina treated- or alumina-silica treated-titanium oxide are employable, but preferably a titanium oxide is used that was treated with a surface-treating agent comprising at least one inorganic surface treating agent selected from the group consisting of aluminum compound including aluminum hydroxide and alumina, silica, and zirconia; and optionally an organic surface-treating agent.

The numeric average particle diameter of the titanium oxide or other white pigments is preferably from 150 to 400 nm, and most preferably from 180 to 350 nm. Sufficient hiding power is generally not obtained when the average diameter is less than 150 nm, and the storage ability and the jet-out suitability of the ink tend to be degraded when the average diameter exceeds 400 nm.

The determination of the numeric average particle diameter is best performed by photon correlation spectroscopy at a wavelength of 633 nm with a 4 mW HeNe laser on a diluted sample of the pigmented inkjet ink. A suitable particle size analyzer is a Malvern™ nano-S available from Goffin-Meyvis. A sample can, for example, be prepared by addition of one drop of ink to a cuvette containing 1.5 mL ethyl acetate and mixed until a homogenous sample was obtained. The measured particle size is the average value of 3 consecutive measurements consisting of 6 runs of 20 seconds.

Generally, pigments are stabilized in the dispersion medium by dispersing agents, such as polymeric dispersants or surfactants. However, the surface of the pigments can be modified to obtain so-called "self-dispersible" or "self-dispersing" pigments, i.e. pigments that are dispersible in the dispersion medium without dispersants.

The pigment is preferably used in a pigment dispersion used for preparing inkjet inks in an amount of 10 to 40 wt %, more preferably of 15 to 30 wt % based on the total weight of the pigment dispersion. In a coloured inkjet ink the pigment is preferably present in an amount of 0.1 to 10 wt %, preferably 1 to 6 wt % based on the total weight of the inkjet ink.

Dispersants

The radiation curable inkjet ink may also contain a dispersant in order to further improve pigment dispersion properties. Examples of the dispersant include, but are not particularly limited to, dispersants commonly used for preparing a pigment dispersion liquid, such as a polymer dispersant, for example.

Typical polymeric dispersants are copolymers of two monomers but may contain three, four, five or even more monomers. The properties of polymeric dispersants depend on both the nature of the monomers and their distribution in the polymer. Copolymeric dispersants preferably have the following polymer compositions:

- statistically polymerized monomers (e.g. monomers A and B polymerized into ABBAABAB);
- alternating polymerized monomers (e.g. monomers A and B polymerized into ABABABAB);
- gradient (tapered) polymerized monomers (e.g. monomers A and B polymerized into AAABAABBABBB);
- block copolymers (e.g. monomers A and B polymerized into AAAAABBBBBB) wherein the block length of each of the blocks (2, 3, 4, 5 or even more) is important for the dispersion capability of the polymeric dispersant;
- graft copolymers (graft copolymers consist of a polymeric backbone with polymeric side chains attached to the backbone); and mixed forms of these polymers, e.g. blocky gradient copolymers.

Suitable polymeric dispersants are listed in the section on "Dispersants", more specifically [0064] to [0070] and [0074] to [0077], in EP 1911814 A (AGFA GRAPHICS) incorporated herein as a specific reference.

The polymeric dispersant has preferably a number average molecular weight Mn between 500 and 30000, more preferably between 1500 and 10000.

The polymeric dispersant has preferably a weight average molecular weight Mw smaller than 100,000, more preferably smaller than 50,000 and most preferably smaller than 30,000.

The polymeric dispersant has preferably a polydispersity PD smaller than 2, more preferably smaller than 1.75 and most preferably smaller than 1.5.

Commercial examples of polymeric dispersants are the following:

- DISPERBYK™ dispersants available from BYK CHEMIE GMBH;
- SOLSPERSE™ dispersants available from LUBRIZOL;
- TEGO™ DISPERS™ dispersants from EVONIK;
- EDAPLAN™ dispersants from MUNZING CHEMIE;
- ETHACRYL™ dispersants from LYONDELL;
- GANEX™ dispersants from ISP;
- DISPEX™ and EFKA™ dispersants from BASF;
- DISPONER™ dispersants from DEUCHEM.

Particularly preferred polymeric dispersants include Solsperse™ dispersants from LUBRIZOL, Efka™ dispersants from BASF, Disperbyk™ dispersants from BYK CHEMIE GMBH, and Ajisper™ dispersants from AJINOMOTO FINE-TECHNO Co. Particularly preferred dispersants are Solsperse™ 32000, 35000 and 39000 dispersants from LUBRIZOL.

The dispersants may be used alone or in combination of two or more kinds thereof.

The polymeric dispersant is preferably used in an amount of 2 to 600 wt %, more preferably 5 to 200 wt %, most preferably 50 to 90 wt % based on the weight of the pigment.

Dispersion Synergists

A dispersion synergist usually consists of an anionic part and a cationic part. The anionic part of the dispersion synergist usually exhibiting a certain molecular similarity with the colour pigment and the cationic part of the dispersion synergist consists of one or more protons and/or cations to compensate the charge of the anionic part of the dispersion synergist.

The dispersion synergist is preferably added in a smaller amount than the polymeric dispersant(s). The ratio of polymeric dispersant/dispersion synergist depends upon the pigment and should be determined experimentally. Typically, the ratio wt % polymeric dispersant versus wt % dispersion synergist is selected between 2:1 to 100:1, preferably between 2:1 and 20:1.

Suitable dispersion synergists that are commercially available include Solsperse™ 5000 and Solsperse™ 22000 from LUBRIZOL.

Particular preferred pigments for the magenta ink used are a diketopyrrolopyrrole pigment or a quinacridone pigment. Suitable dispersion synergists include those disclosed in EP 1790698 A (AGFA GRAPHICS), EP 1790696 A (AGFA GRAPHICS), WO 2007/060255 (AGFA GRAPHICS) and EP 1790695 A (AGFA GRAPHICS).

In dispersing C.I. Pigment Blue 15:3, the use of a sulfonated Cu-phthalocyanine dispersion synergist, e.g. Solsperse™ 5000 from LUBRIZOL is preferred. Suitable dispersion synergists for yellow inkjet inks include those disclosed in EP 1790697 A (AGFA GRAPHICS).

Stabilizers

The radiation curable inkjet ink may also contain a stabilizer, such as a polymerization inhibitor. Due to the fact that an ink contains the polymerization inhibitor, a polymerization reaction before curing can be prevented.

Suitable polymerization inhibitors include phenol type antioxidants, hindered amine light stabilizers, phosphor type antioxidants, benzoquinone, hydroquinone and derivatives, such as hydroquinone monomethyl ether commonly used in (meth)acrylate monomers.

Examples of the phenolic polymerization inhibitor include, but are not limited to the following substances, p-methoxy phenol, cresol, t-butyl catechol, di-t-butyl-p-cresol, hydroquinone monomethylether, α-naphthol, 3,5-di-t-butyl-4-hydroxytoluene, 2,6-di-t-butyl-4-methylphenol, 2,2'-methylene-bis(4-methyl-6-t-butylphenol), 2,2'-methylene-bis(4-ethyl-6-butylphenol), and 4,4'-thio-bis(3-methyl-6-t-butylphenol) and pyrogallol.

Suitable commercial inhibitors are, for example, Sumilizer™ GA-80, Sumilizer™ GM and Sumilizer™ GS produced by Sumitomo Chemical Co. Ltd.; Genorad™ 16, Genorad™ 18 and Genorad™ 20 from Rahn AG; Irgastab™ UV10 and Irgastab™ UV22, Tinuvin™ 460 and CGS20 from Ciba Specialty Chemicals; Floorstab™ UV range (UV-1, UV-2, UV-5 and UV-8) from Kromachem Ltd, Additol™ S range (S100, S110, S120 and S130) from Cytec Surface Specialties.

A preferred polymerization inhibitor is Irgastab™ UV10 from BASF. Other examples of polymerization inhibitors include TEMPO, TEMPOL, and Al cupferron.

The polymerization inhibitors may be used alone or in combination of two or more kinds thereof.

In a preferred embodiment, the polymerization inhibitor is a mixture of different types of polymerization inhibitors. Preferred polymerization inhibitors are mixtures of an oxyl free radical-based polymerization inhibitor, a phenol-based polymerization inhibitor, and an amine-based polymerization inhibitor. Suitable examples are given in EP 2851402 A (FUJIFILM).

The polymerization inhibitor is preferably added at 200 to 20,000 ppm relative to the total amount of the inkjet ink.

Surfactants

The radiation curable inkjet ink may contain at least one surfactant. The surfactant can be anionic, cationic, non-ionic, or zwitter-ionic and is preferably added in a total dry weight quantity less than 3 wt % based on the total weight of the ink and particularly in a total less than 1.5 wt % based on the total weight of the radiation curable inkjet ink to prevent foaming of the ink in its container. The content of the surfactant is preferably 0.05 to 1.5 wt %, more preferably 0.10 to 1.0 wt % based on the total weight of the radiation curable inkjet ink.

Preferred surfactants are selected from fluoro surfactants (such as fluorinated hydrocarbons) and silicone surfactants. The silicone surfactants are preferably siloxanes and can be alkoxylated, polyester modified, polyether modified, polyether modified hydroxy functional, amine modified, epoxy modified and other modifications or combinations thereof. Preferred siloxanes are polymeric, for example polydimethylsiloxanes.

Preferred commercial silicone surfactants include BYK™ 333 and BYK™ UV3510 from BYK Chemie.

In a preferred embodiment, the surfactant is a polymerizable compound.

Preferred polymerizable silicone surfactants include a (meth)acrylated silicone surfactant. Most preferably the (meth)acrylated silicone surfactant is an acrylated silicone surfactant, because acrylates are more reactive than methacrylates.

In a preferred embodiment, the (meth)acrylated silicone surfactant is a polyether modified (meth)acrylated polydimethylsiloxane or a polyester modified (meth)acrylated polydimethylsiloxane.

Preferred commercially available (meth)acrylated silicone surfactants include: Ebecryl™ 350, a silicone diacrylate from Cytec; the polyether modified acrylated polydimethylsiloxane BYK™ UV3500 and BYK™ UV3530, the polyester modified acrylated polydimethylsiloxane BYK™ UV3570, all manufactured by BYK Chemie; Tego™ Rad 2100, Tego™ Rad 2200N, Tego™ Rad 2250N, Tego™ Rad 2300, Tego™ Rad 2500, Tego™ Rad 2600, and Tego™ Rad 2700, Tego™ RC711 from EVONIK; Silaplane™ FM7711, Silaplane™ FM7721, Silaplane™ FM7731, Silaplane™ FM0711, Silaplane™ FM0721, Silaplane™ FM0725, Silaplane™ TM0701, Silaplane™ TM0701T all manufactured by CHISSO Corporation; and DMS-R05, DMS-R11, DMS-R18, DMS-R22, DMS-R31, DMS-U21, DBE-U22, SIB1400, RMS-044, RMS-033, RMS-083, UMS-182, UMS-992, UCS-052, RTT-1011 and UTT-1012 all manufactured by GELEST Inc.

Preparation of Radiation Curable Inkjet Inks

The preparation of pigmented radiation curable inkjet inks is well-known to the skilled person. Pigment dispersions may be prepared by precipitating or milling the pigment in the dispersion medium in the presence of the dispersant.

Mixing apparatuses may include a pressure kneader, an open kneader, a planetary mixer, a dissolver, and a Dalton Universal Mixer. Suitable milling and dispersion apparatuses are a ball mill, a pearl mill, a colloid mill, a high-speed disperser, double rollers, a bead mill, a paint conditioner, and triple rollers. The dispersions may also be prepared using ultrasonic energy.

Many different types of materials may be used as milling media, such as glasses, ceramics, metals, and plastics. In a preferred embodiment, the grinding media can comprise particles, preferably substantially spherical in shape, e.g. beads consisting essentially of a polymeric resin or yttrium stabilized zirconium beads.

In the process of mixing, milling and dispersion, each process is preferably performed with cooling to prevent build-up of heat, and as much as possible under light conditions in which actinic radiation has been substantially excluded.

The pigment dispersion may contain more than one pigment. Such a pigment dispersion may be prepared using separate dispersions for each pigment, or alternatively several pigments may be mixed and co-milled in preparing the dispersion.

The dispersion process can be carried out in a continuous, batch or semi-batch mode.

The preferred amounts and ratios of the ingredients of the mill grind will vary widely depending upon the specific materials and the intended applications. The contents of the milling mixture comprise the mill grind and the milling media. The mill grind comprises pigment, polymeric dispersant and a liquid carrier.

The milling time can vary widely and depends upon the pigment, the selected mechanical means and residence conditions, the initial and desired final particle size, etc. In the present invention pigment dispersions with an average particle size of less than 100 nm may be prepared.

After milling is completed, the milling media is separated from the milled particulate product (in either a dry or liquid dispersion form) using conventional separation techniques, such as by filtration, sieving through a mesh screen, and the like. Often the sieve is built into the mill, e.g. for a bead mill.

The milled pigment concentrate is preferably separated from the milling media by filtration.

In general, it is desirable to make inkjet inks in the form of a concentrated mill grind, which is subsequently diluted to the appropriate concentration for use in the inkjet printing system. This technique permits preparation of a greater quantity of pigmented ink from the equipment. By dilution, the inkjet ink is adjusted to the desired viscosity, surface tension, colour, hue, saturation density, and print area coverage for the particular application.

Substrates

There is no real limitation on the type of substrate. The substrates may have ceramic, metallic or polymeric surfaces for printing upon.

The substrate may be porous, as e.g. textile, paper and card board substrates, or may be a substantially non-absorbing substrate such as e.g. a substrate having a polyethylene terephthalate surface.

Preferred substrates are those including surfaces of polyethylene, polypropylene, polycarbonate, polyvinyl chloride, polyesters like polyethylene terephthalate (PET), polyethylene naphthalate (PEN) and polylactide (PLA) and polyimide.

A particularly preferred substrate printed with inkjet inks from the inkjet ink set of the invention is selected from the group consisting of a polypropylene substrate and a polymethylmethacrylate substrate.

The substrate may also be a paper substrate, such as plain paper or resin coated paper, e.g. polyethylene or polypropylene coated paper. There is no real limitation on the type of paper and it includes newsprint paper, magazine paper, office paper, wallpaper but also paper of higher grammage, usually referred to as boards, such as white lined chipboard, corrugated board and packaging board.

The substrates may be transparent, translucent or opaque. Preferred opaque substrates includes so-called synthetic paper, like the Synaps™ grades from Agfa-Gevaert which is an opaque polyethylene terephthalate sheet.

There is no restriction on the shape of the substrate. It can be a flat sheet, such a paper sheet or a polymeric film or it can be a three dimensional object like e.g. a bottle or a jerry-can.

Inkjet Printing Methods

An inkjet printing method according to a preferred embodiment of the invention includes the steps of: jetting inkjet inks of the inkjet ink set as described above on a substrate; and UV curing the inkjet ink on the substrate by a UV light-emitting diode having an emission peak wavelength in a range of 350 to 420 nm. The UV curing is preferably performed by UV LEDs having an emission wavelength larger than 360 nm, preferably larger than 370 nm.

The radiation curable inkjet inks are jetted by one or more print heads ejecting small droplets in a controlled manner through nozzles onto a substrate moving relative to the print head(s). A preferred print head for the inkjet printing system is a piezoelectric head. Piezoelectric inkjet printing is based on the movement of a piezoelectric ceramic transducer when a voltage is applied thereto. The application of a voltage changes the shape of the piezoelectric ceramic transducer in the print head creating a void, which is then filled with inkjet ink or liquid. When the voltage is again removed, the ceramic expands to its original shape, ejecting a drop of ink from the print head.

A preferred piezoelectric print head is a so called push mode type piezoelectric print head, which has a rather large piezo-element capable of ejecting also more viscous inkjet ink droplets. Such a print head is available from RICOH as the GEN5s print head.

A preferred piezoelectric print head is a so-called through-flow piezoelectric drop-on-demand print head. Such a print head is available from TOSHIBA TEC as the CF1ou print head. Through-flow print heads are preferred because they enhance the reliability of inkjet printing.

The inkjet print head normally scans back and forth in a transversal direction across the moving ink-receiver surface. Sometimes the inkjet print head does not print on the way back, however bi-directional printing is preferred for obtaining a high areal throughput.

Another preferred printing method is by a "single pass printing process", which can be performed by using page wide inkjet print heads or multiple staggered inkjet print heads that cover the entire width of the substrate surface. In a single pass printing process, the inkjet print heads usually remain stationary and the substrate is transported under the inkjet print heads.

In a particularly preferred embodiment, the inkjet printing of the UV curable inkjet inks is performed in a multi-pass printing mode. Multi-pass printing is a technique used to reduce banding in ink-jet printing. Dots of ink, when still in liquid form, tend to run together due to surface tension. This is referred to as coalescence. To print a high quality image, it is important to print individual round dots. But to achieve full saturated colours, the dots must overlap to completely cover the substrate. By only printing a portion of the image data so as to avoid simultaneously printing adjacent dots during each printing cycle, coalescence may be largely avoided. Additionally, by avoiding all horizontal adjacencies, the transverse speed of the printing mechanism can be increased up to two times the rated print speed of the print head. In a preferred embodiment, the number of passes used is to 2 to 6 passes, more preferably no more than 4 passes.

An advantage of using a multi-pass printing mode is that the UV curable inkjet inks are cured in consecutive passes, rather than in a single pass requiring a curing device with a high UV output. The print head lifetime is also larger for multi pass printing. While in single pass printing one side shooter is sufficient to replace the whole print head, in multi pass printing side shooters and even failings can be tolerated. Also the cost of a multi-pass printer is usually much lower, especially for wide format substrates.

Curing Devices

The radiation curable inkjet inks are preferably cured by ultraviolet radiation. The UV curing device may be arranged in combination with the print head of the inkjet printer, travelling therewith so that the UV curable inkjet ink is exposed to curing radiation very shortly after been jetted.

In such an arrangement it can be difficult to provide a small enough UV radiation source connected to and travelling with the print head. Therefore, a static fixed radiation source may be employed, e.g. a source of curing UV-light, connected to the radiation source by means of flexible radiation conductive means such as a fibre optic bundle or an internally reflective flexible tube.

Alternatively, the actinic radiation may be supplied from a fixed source to the radiation head by an arrangement of mirrors including a mirror upon the radiation head.

The source of radiation arranged not to move with the print head, may also be an elongated radiation source extending transversely across the ink-receiver surface to be cured and adjacent the transverse path of the print head so that the subsequent rows of images formed by the print head are passed, stepwise or continually, beneath that radiation source.

Any ultraviolet light source, as long as part of the emitted light can be absorbed by the photo-initiator or photo-initiator system, may be employed as a radiation source, such as, a high or low pressure mercury lamp, a cold cathode tube, a black light, an ultraviolet LED, an ultraviolet laser, and a flash light. Of these, the preferred source is one exhibiting a relatively long wavelength UV-contribution having a dominant wavelength of 300-400 nm. Specifically, a UV-A light source is preferred due to the reduced light scattering therewith resulting in more efficient interior curing.

In a preferred embodiment, the UV curing is performed using UV LEDs, particularly those having an emission wavelength higher than 370 nm. UV LEDs usually also come in a compact structure allowing them to travel along with the print heads in a multi-pass printer UV radiation is generally classed as UV-A, UV-B, and UV-C as follows:

UV-A: 400 nm to 320 nm

UV-B: 320 nm to 290 nm

UV-C: 290 nm to 100 nm.

Furthermore, it is possible to cure the image using, consecutively or simultaneously, two light sources of differing wavelength or illuminance. For example, the first UV-source can be selected to be rich in UV-C, in particular in the range of 260 nm-200 nm. The second UV-source can then be rich in UV-A, e.g. a gallium-doped lamp, or a different lamp high in both UV-A and UV-B. The use of two UV-sources has been found to have advantages, such as a fast curing speed and a high curing degree.

For facilitating curing, the inkjet printer often includes one or more oxygen depletion units. The oxygen depletion units place a blanket of nitrogen or other relatively inert gas (e.g. $CO_2$), with adjustable position and adjustable inert gas concentration, in order to reduce the oxygen concentration in the curing environment. Residual oxygen levels are usually maintained as low as 200 ppm, but are generally in the range of 200 ppm to 1200 ppm.

EXAMPLE

Materials

All materials used in the following examples were readily available from standard sources such as Aldrich Chemical Co. (Belgium) and Acros (Belgium) unless otherwise specified. The water used was demineralized water.

PB15:4 is an abbreviation used for Hostaperm™ Blue BT-617-D, a C.I. Pigment Blue 15:4 pigment from CLARIANT.

PR122 is an abbreviation used for Pigment Red 122 TCR12203IJ, a C.I. Pigment Red 122 pigment from TRUST CHEM EUROPE BV.

PY155 is an abbreviation used for Ink Jet Yellow 4GC, a C.I. Pigment Yellow 155 pigment from CLARIANT.

PB7 is an abbreviation used for Special Black™ 550, which is a carbon black available from EVONIK.

SYN is the dispersion synergist according to Formula (A):

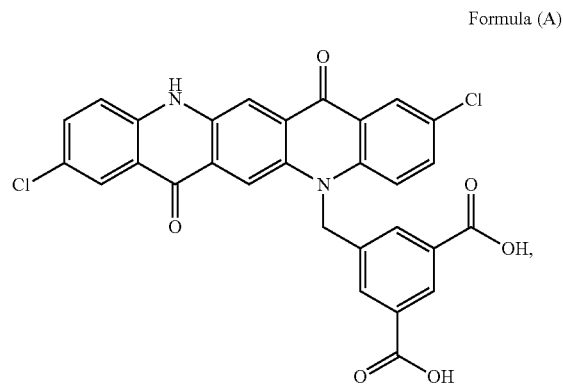 [SMILES: O=C(O)c1cc(Cn2c3ccc(Cl)cc3c(=O)c3cc4[nH]c5ccc(Cl)cc5c(=O)c4cc32)cc(C(=O)O)c1]

Formula (A)

and was synthesized in the same manner as described in Example 1 of WO 2007/060254 (AGFA GRAPHICS) for the synergist QAD-3.

DB162 is an abbreviation used for the polymeric dispersant Disperbyk™ 162 available from BYK CHEMIE GMBH whereof the solvent mixture of 2-methoxy-1-methylethylacetate, xylene and n-butylacetate was removed. The polymeric dispersant is a polyester-polyurethane dispersant on the basis of caprolacton and toluene diisocyanate having an amine value of 13 mg KOH/g, a Mn of about 4,425 and a Mw of about 6,270.

PEA is 2-phenoxyethyl acrylate available as Sartomer™ SR339C from ARKEMA.

DPGDA is dipropyleneglycoldiacrylate available as Laromer™ DPGDA from BASF.

MPDA is 3-methyl-1,6-pentanediyldiacrylate available as Sartomer™ SR341 from ARKEMA.

HDDA is 1,6-hexanedioldiacrylate available from ALLNEX

TCDDA is tricyclodecane dimethanol diacrylate available as Sartomer™ SR833s from ARKEMA.

NPGDA is neopentylglycol hydroxypivalate diacrylate available as Sartomer™ SR606A from ARKEMA.

IBOA is isobornylacrylate available as Sartomer™ SR506D from ARKEMA.

VCL is N-vinyl caprolactam available from BASF BELGIUM, NV.

VMOX is vinyl methyl oxazolidinone available as VMOX (CAS No 3395-98-0) from BASF.

ACMO is 4-acryloylmorpholine available as Omnimer™ ACMO from IGM.

IDA is isodecyl acrylate available as Sartomer™ SR395 from ARKEMA.

TCDA is (octahydro-4,7-methano-1H-indenyl)methyl acrylate available as Sartomer™ SR789 from ARKEMA.

CN963B80 is a urethane acrylate oligomer available as Sartomer™ CN963B80 from ARKEMA.

CN2003EU is an epoxyacrylate oligomer available as Sartomer™ CN2003EU from ARKEMA.

TPO is trimethylbenzoyl diphenyl phosphine oxide supplied as Omnirad™ TPO by IGM.

ITX is Darocur™ ITX is an isomeric mixture of 2- and 4-isopropyl thioxanthone from IGM.

CN3755 is an acrylated amine synergist available as Sartomer™ CN 3755 from ARKEMA.

KF6038 is a silicone surfactant available as KF-6038 from SHINETSU CHEMICAL.

SILJ208 is a silicone surfactant available as Silube™ J208-812 from SILTECH CORPORATION.

C7500 is a silicone surfactant available as Silwet™ L7500 from OSI SPECIALITIES BENELUX NV.

UV10 is 4-hydroxy-2,2,6,6-tetramethylpiperidinooxy sebacate, a stabilizer available as Irgastab™ UV10 from CHEMOS GMBH STABI is a mixture forming a polymerization inhibitor having a composition according to Table 1.

TABLE 1

| DPGDA | wt % |
|---|---|
| VEEA | 82.4 |
| p-methoxyphenol | 4.0 |
| Butylated hydroxytoluene (BHT) | 10.0 |
| Cupferron ™ AL | 3.6 |

Cupferron™ AL is aluminum N-nitrosophenylhydroxylamine from WAKO CHEMICALS LTD.

PP1 is a polypropylene substrate available as Buplex™ PP-3 mm from BUHRMANN UBBENS BV.

PP2 is a polypropylene substrate available as Biprint™ from ANTALIS.

PVC is a polyvinylchloride substrate available as Metamark™ MD5-100 from METAMARK.

PC is a polycarbonate substrate available as Lexan™ pc SG305 from VINK NV.

PMMA is a polymethylmethacrylate substrate available as Barlo™ XT from BARLO.

PS is a polystyrene substrate available as Irostyrene™ MAT from IROPLASTICS.

Measurement Methods

1. Average Particle Size

The average particle size of pigment particles in a pigment dispersion was determined by photon correlation spectroscopy at a wavelength of 633 nm with a 4 mW HeNe laser on a diluted sample of the pigmented inkjet ink. The particle size analyzer used was a Malvern™ nano-S available from Goffin-Meyvis.

The sample was prepared by addition of one drop of dispersion to a cuvette containing 1.5 mL ethyl acetate and mixed until a homogenous sample was obtained. The measured particle size is the average value of 3 consecutive measurements consisting of 6 runs of 20 seconds.

2. Adhesion

For each inkjet ink set, a colour pattern was printed on a selected substrate by an Anapurna™ H2050i LED inkjet system available from AGFA NV. The colour pattern included 10 cm×10 cm squares for each different colour printed by an ink coverage as indicated in Table 2.

TABLE 2

| Colour | Ink coverage |
|---|---|
| Cyan | 100% cyan ink |
| Magenta | 100% magenta ink |
| Yellow | 100% yellow ink |
| Black | 100% black ink |
| Red | 100% magenta ink + 100% yellow ink |
| Green | 100% cyan ink + 100% yellow ink |
| Blue | 100% cyan ink + 100% magenta ink |
| Full Black | 100% cyan ink + 100% magenta ink + 100% yellow ink + 100% black ink |

Adhesion was tested on each colour square using a cross hatch cutter set Elcometer™ 1542. The distance between the applied scratches is 1 mm. A 5 cm long strip of Tesatape™ 4104 PVC tape was pressed on to the cross cut inkjet ink. The tape was pressed four times with the thumb before removing it in one sharp pull. The adhesion was then evaluated in accordance with the evaluation values described in Table 3.

TABLE 3

| Evaluation value | Observation |
|---|---|
| 0 | Nothing removed, perfect adhesion. |
| 1 | Detachment of only very small parts of the inkjet ink coating, almost perfect adhesion. |
| 2 | Minor parts of the inkjet ink coating was removed by the tape, good adhesion |
| 3 | Parts of the inkjet ink coating were removed by the tape, poor adhesion. |
| 4 | Most of the inkjet ink coating was removed by the tape, poor adhesion. |
| 5 | The inkjet ink was completely removed from the substrate by the tape, no adhesion. |

For each tested substrate, the sum of the adhesion scores for the 8 colour squares of Table 2 was made. For a good adhesion, this sum should be smaller than 10 for a certain substrate.

3. Stickiness

The stickiness of the inks is tested by printing wedges having colour squares increasing per 5% ink coverage for all the same colours as shown in Table 2 on a 700×1000 mm coated paper MultiArt™ Gloss from PAPYRUS. 3 samples are printed for each ink set. A stack as shown in Table 4 is made by placing the three printed samples on a Dibond® plate supported on a flat rigid surface to prevent any deformation. An unprinted coated paper MultiArt™ Gloss is placed on top of the three printed samples, followed by a metal plate of 100 kg.

TABLE 4

| Metal plate (100 kg) |
|---|
| Unprinted coated paper MultiArt ™ Gloss |
| Printed Sample 1 |
| Printed Sample 2 |
| Printed Sample 3 |
| Dibond ® plate |

After 24 hours the stack is disassembled and the printed samples are evaluated for damages to the ink colour patches. The evaluation received a score for an evaluation according to Table 5.

TABLE 5

| | Evaluation of the ink colour patches | |
|---|---|---|
| Score | Cyan, magenta, yellow and black | Red, green, blue and full black |
| 0 | No defects visible at 100% | No defects visible at 400% |
| 1 | No defects visible till 95% | No defects visible till 340% |
| 2 | No defects visible till 90% | No defects visible till 300% |
| 3 | No defects visible till 85% | No defects visible till 280% |
| 4 | No defects visible till 80% | No defects visible till 240% |
| 5 | Defects visible below 75%% | Defects visible below 240% |

Stickiness of ink towards the next printed sample on top should be low enough in order not to damage the back of the next printed sheet, or to damage the ink colour patches on a printed sheet. In this perspective it is required to have at most a score of 3. Excellent results for stickiness is considered to have a score of 0 or 1.

4. Surface Tension

The static surface tension of the UV curable inks was measured with a KRÜSS tensiometer K9 from KRÜSS GmbH, Germany at 25° C. after 60 seconds.

5. Viscosity

The viscosity of the UV curable compositions was measured at 45° C. and at a shear rate of 1,000 s$^{-1}$ using a Rotovisco™ RV1 viscometer from HAAKE.

Example 1

This example illustrates the effect of the polymerizable composition on the adhesion to different substrates and the stickiness.

Preparation of Concentrated Pigment Dispersions

Concentrated pigmented dispersions were prepared having a composition as shown by Table 6.

TABLE 6

| wt % of: | CPC1 | CPC2 | CPM1 | CPY1 | CPK1 |
|---|---|---|---|---|---|
| PB15:4 | 25.0 | 24.0 | | | 5.6 |
| PR122 | | | 20.0 | | 4.0 |
| PY155 | | | | 25.0 | |
| PB7 | | | | | 15.5 |
| SYN | | | 1.0 | | 0.2 |
| DB162 | 10.0 | 8.0 | 10.0 | 8.0 | 10.7 |
| STABI | 1.0 | 1.6 | 1.0 | 1.0 | 2.0 |
| PEA | 64.0 | | 68.0 | 66.0 | 62.0 |
| DPGDA | | 66.4 | | | |
| Total | 100.0 | 100.0 | 100.0 | 100.0 | 100.0 |

Each concentrated pigmented dispersion was prepared in the same manner as illustrated here below for the concentrated pigmented dispersion CPC1.

The dispersion CPC1 was prepared by mixing its components according to Table 6 for 30 minutes using a DISPERLUX™ disperser from DISPERLUX S.A.R.L., Luxembourg. The dispersion was then milled using a Bachofen DYNOMILL ECM mill filled with 0.4 mm yttrium stabilized zirconia beads from TOSOH. The mixture was circulated over the mill for 2 hours. After milling, the concentrated pigment dispersion was discharged over a 1 μm filter into a vessel.

The resulting concentrated pigment dispersions had an average particle size according to Table 7.

TABLE 7

| Dispersion | Average Particle Size |
|---|---|
| CPC1 | 83 nm |
| CPC2 | 102 nm |
| CPM1 | 111 nm |
| CPY1 | 154 nm |
| CPK1 | 104 nm |

Preparation of Inkjet Inks

The above prepared concentrated dispersions were then used to prepare the cyan, magenta, yellow and black inks of the ink sets INV-1 to INV-6 and COMP-1 to COMP-9 according to Table 8.

TABLE 8

| Ink Set | Cyan Ink | Magenta Ink | Yellow Ink | Black Ink |
|---|---|---|---|---|
| INV-1 | C1 | M1 | Y1 | K1 |
| INV-2 | C2 | M2 | Y2 | K2 |
| INV-3 | C3 | M3 | Y3 | K3 |
| INV-4 | C4 | M4 | Y4 | K4 |
| INV-5 | C5 | M5 | Y5 | K5 |
| INV-6 | C6 | M6 | Y6 | K6 |
| COMP-1 | C7 | M7 | Y7 | K7 |
| COMP-2 | C8 | M8 | Y8 | K8 |
| COMP-3 | C9 | M9 | Y9 | K9 |
| COMP-4 | C10 | M10 | Y10 | K10 |
| COMP-5 | C11 | M11 | Y11 | K11 |
| COMP-6 | C12 | M12 | Y12 | K12 |
| COMP-7 | C13 | M13 | Y13 | K13 |
| COMP-8 | C14 | M14 | Y14 | K14 |
| COMP-9 | C15 | M15 | Y15 | K15 |

The different UV curable inkjet inks were prepared by mixing the components as shown in the tables here below. The wt % is based on the total weight of the inkjet ink.

Table of Cyan Inkjet inks

| Component | wt % of: | C1 | C2 | C3 | C4 | C5 | C6 | C7 | C8 | C9 | C10 |
|---|---|---|---|---|---|---|---|---|---|---|---|
| Pigment Dispersion | CPC1 | 7.20 | 7.20 | 7.20 | 7.20 | 7.20 | 7.20 | 7.20 | 7.20 | 7.20 | |
| | CPC2 | | | | | | | | | | 7.50 |
| Multifunctional monomer | MPDA | | | | 0.54 | 0.54 | | | | | |
| | TCDDA | | | 0.54 | | | | | | | 3.70 |
| | NPGDA | 3.54 | 0.54 | | | | 5.54 | 3.54 | 3.54 | 6.04 | |
| Multifunctional monomer | PEA | 27.73 | 27.43 | 27.73 | 27.13 | 31.78 | 31.23 | 32.38 | 37.23 | 37.43 | 32.90 |
| | IBOA | 27.4 | 30.70 | 30.40 | 31.00 | 26.35 | 23.90 | 22.75 | 17.90 | 15.20 | 18.27 |
| | VCL | 13.40 | 13.40 | 13.40 | 13.40 | 13.40 | 13.40 | 13.40 | 13.40 | 13.40 | 13.00 |
| | ACMO | | | | | | | | | | 3.40 |
| Oligomer | CN963B80 | 4.50 | 4.50 | 4.50 | 4.50 | 4.50 | | 4.50 | 4.50 | 4.50 | 5.00 |
| | CN2003EU | | | | | | 2.50 | | | | |
| Photoinitiating system | TPO | 7.35 | 7.35 | 7.35 | 7.35 | 7.35 | 7.35 | 7.35 | 7.35 | 7.35 | 7.35 |
| | ITX | | | | | | | | | | |
| | CN3755 | 7.00 | 7.00 | 7.00 | 7.00 | 7.00 | 7.00 | 7.00 | 7.00 | 7.00 | 7.00 |
| Surfactant | KF6038 | 0.70 | 0.70 | 0.70 | 0.70 | 0.70 | 0.70 | 0.70 | 0.70 | 0.70 | |
| | SILJ208 | | | | | | | | | | 1.00 |

Table of Cyan Inkjet inks (continued)

| | | | | | | | | | | | |
|---|---|---|---|---|---|---|---|---|---|---|---|
| Stabilizer | UV10 | 0.30 | 0.30 | 0.30 | 0.30 | 0.30 | 0.30 | 0.30 | 0.30 | 0.30 | |
| | STABI | 0.88 | 0.88 | 0.88 | 0.88 | 0.88 | 0.88 | 0.88 | 0.88 | 0.88 | 0.88 |
| Total | | 100.00 | 100.00 | 100.00 | 100.00 | 100.00 | 100.00 | 100.00 | 100.00 | 100.00 | 100.00 |

| Component | wt % of: | C11 | C12 | C13 | C14 | C15 |
|---|---|---|---|---|---|---|
| Pigment Dispersion | CPC1 | | | | | |
| | CPC2 | 7.50 | 7.50 | 7.50 | 7.50 | 7.50 |
| Multifunctional monomer | MPDA | | | | | |
| | TCDDA | | | | | |
| | NPGDA | 3.00 | 7.25 | 1.00 | 1.00 | |
| Multifunctional monomer | PEA | 37.75 | 33.25 | 39.75 | 42.52 | 44.52 |
| | IBOA | 17.37 | 17.87 | 17.37 | 16.00 | 15.50 |
| | VCL | 13.40 | 13.40 | 13.40 | 12.00 | 11.50 |
| | ACMO | | | | | |
| Oligomer | CN963B80 | 4.75 | 4.50 | 4.75 | 4.75 | 4.75 |
| | CN2003EU | | | | | |
| Photoinitiating system | TPO | 7.35 | 7.35 | 7.35 | 7.35 | 7.35 |
| | ITX | | | | | |
| | CN3755 | 7.00 | 7.00 | 7.00 | 7.00 | 7.00 |
| Surfactant | KF6038 | | | | | |
| | SILJ208 | 1.00 | 1.00 | 1.00 | 1.00 | 1.00 |
| Stabilizer | UV10 | | | | | |
| | STABI | 0.88 | 0.88 | 0.88 | 0.88 | 0.88 |
| Total | | 100.00 | 100.00 | 100.00 | 100.00 | 100.00 |

Table of Magenta Inkjet inks

| Component | wt % of: | M1 | M2 | M3 | M4 | M5 | M6 | M7 | M8 | M9 |
|---|---|---|---|---|---|---|---|---|---|---|
| Pigment Dispersion | CPM1 | 18.52 | 18.52 | 18.52 | 18.52 | 18.52 | 18.52 | 18.52 | 18.52 | 18.52 |
| Multifunctional monomer | MPDA | | | | 4.78 | 4.78 | | | | |
| | TCDDA | | | 4.78 | | | | | | |
| | NPGDA | 7.78 | 4.78 | | | | 8.28 | 7.78 | 7.78 | 10.28 |
| Multifunctional monomer | PEA | 19.14 | 20.04 | 21.74 | 16.44 | 20.99 | 23.54 | 23.74 | 28.44 | 28.64 |
| | IBOA | 27.30 | 29.40 | 27.70 | 33.00 | 28.45 | 22.90 | 22.70 | 18.00 | 15.30 |
| | VCL | 12.70 | 12.70 | 12.70 | 12.70 | 12.70 | 12.70 | 12.70 | 12.70 | 12.70 |
| | ACMO | | | | | | | | | |
| Oligomer | CN963B80 | 1.00 | 1.00 | 1.00 | 1.00 | 1.00 | | 1.00 | 1.00 | 1.00 |
| | CN2003EU | | | | | | 0.50 | | | |
| Photoinitiating system | TPO | 8.00 | 8.00 | 8.00 | 8.00 | 8.00 | 8.00 | 8.00 | 8.00 | 8.00 |
| | CN3755 | 3.75 | 3.75 | 3.75 | 3.75 | 3.75 | 3.75 | 3.75 | 3.75 | 3.75 |
| Surfactant | KF6038 | 0.70 | 0.70 | 0.70 | 0.70 | 0.70 | 0.70 | 0.70 | 0.70 | 0.70 |
| | SILJ208 | | | | | | | | | |
| Stabilizer | UV10 | 0.30 | 0.30 | 0.30 | 0.30 | 0.30 | 0.30 | 0.30 | 0.30 | 0.30 |
| | STABI | 0.81 | 0.81 | 0.81 | 0.81 | 0.81 | 0.81 | 0.81 | 0.81 | 0.81 |
| Total | | 100.00 | 100.00 | 100.00 | 100.00 | 100.00 | 100.00 | 100.00 | 100.00 | 100.00 |

| Component | wt % of: | M10 | M11 | M12 | M13 | M14 | M15 |
|---|---|---|---|---|---|---|---|
| Pigment Dispersion | CPM1 | 18.52 | 18.52 | 18.52 | 18.52 | 18.52 | 18.52 |
| Multifunctional monomer | MPDA | | | | | | |
| | TCDDA | | | | | | |
| | NPGDA | 10.00 | 6.00 | 8.00 | 4.00 | 1.00 | 1.20 |
| Multifunctional monomer | PEA | 18.27 | 15.17 | 20.27 | 27.02 | 30.27 | 31.47 |
| | IBOA | 22.00 | 22.35 | 25.25 | 22.50 | 22.25 | 22.25 |
| | VCL | 13.40 | 13.40 | 13.40 | 13.40 | 13.40 | 12.00 |
| | ACMO | 3.25 | | | | | |
| Oligomer | CN963B80 | 1.00 | 1.00 | 1.00 | 1.00 | 1.00 | 1.00 |
| | CN2003EU | | | | | | |
| Photoinitiating system | TPO | 8.00 | 8.00 | 8.00 | 8.00 | 8.00 | 8.00 |
| | CN3755 | 3.75 | 3.75 | 3.75 | 3.75 | 3.75 | 3.75 |
| Surfactant | KF6038 | | | | | | |
| | SILJ208 | 1.00 | 1.00 | 1.00 | 1.00 | 1.00 | 1.00 |
| Stabilizer | UV10 | | | | | | |
| | STABI | 0.81 | 0.81 | 0.81 | 0.81 | 0.81 | 0.81 |
| Total | | 100.00 | 100.00 | 100.00 | 100.00 | 100.00 | 100.00 |

| Table of Yellow Inkjet inks | | | | | | | | | | |
|---|---|---|---|---|---|---|---|---|---|---|
| Component | wt % of: | Y1 | Y2 | Y3 | Y4 | Y5 | Y6 | Y7 | Y8 | Y9 |
| Pigment Dispersion | CPY1 | 10.20 | 10.20 | 10.20 | 10.20 | 10.20 | 10.20 | 10.20 | 10.20 | 10.20 |
| Multifunctional monomer | DPGDA | | | | | | | | | |
| | MPDA | | | | 1.56 | 1.56 | | | | |
| | HDDA | | | | | | | | | |
| | TCDDA | | | 1.56 | | | | | | |
| | NPGDA | 4.56 | 1.56 | | | | 6.96 | 4.56 | 4.56 | 7.06 |
| Multifunctional monomer | PEA | 25.99 | 25.64 | 26.64 | 24.84 | 29.44 | 30.24 | 30.54 | 35.24 | 35.59 |
| | IBOA | 26.15 | 29.50 | 28.50 | 30.30 | 25.70 | 21.90 | 21.60 | 16.80 | 14.05 |
| | VCL | 13.40 | 13.40 | 13.40 | 13.40 | 13.40 | 13.40 | 13.40 | 13.40 | 13.40 |
| Oligomer | CN963B80 | 3.80 | 3.80 | 3.80 | 3.80 | 3.80 | | 3.80 | 3.80 | 3.80 |
| | CN2003EU | | | | | | 1.40 | | | |
| Photoinitiating system | TPO | 5.50 | 5.50 | 5.50 | 5.50 | 5.50 | 5.50 | 5.50 | 5.50 | 5.50 |
| | ITX | 3.00 | 3.00 | 3.00 | 3.00 | 3.00 | 3.00 | 3.00 | 3.00 | 3.00 |
| | CN3755 | 5.50 | 5.50 | 5.50 | 5.50 | 5.50 | 5.50 | 5.50 | 5.50 | 5.50 |
| Surfactant | KF6038 | 0.70 | 0.70 | 0.70 | 0.70 | 0.70 | 0.70 | 0.70 | 0.70 | 0.70 |
| | SILJ208 | | | | | | | | | |
| Stabilizer | UV10 | 0.30 | 0.30 | 0.30 | 0.30 | 0.30 | 0.30 | 0.30 | 0.30 | 0.30 |
| | STABI | 0.90 | 0.90 | 0.90 | 0.90 | 0.90 | 0.90 | 0.90 | 0.90 | 0.90 |
| Total | | 100.00 | 100.00 | 100.00 | 100.00 | 100.00 | 100.00 | 100.00 | 100.00 | 100.00 |

| Component | wt % of: | Y10 | Y11 | Y12 | Y13 | Y14 | Y15 |
|---|---|---|---|---|---|---|---|
| Pigment Dispersion | CPY1 | 10.20 | 10.20 | 10.20 | 10.20 | 10.20 | 10.20 |
| Multifunctional monomer | DPGDA | | | | | | |
| | MPDA | | | | | | |
| | HDDA | | | | | | |
| | TCDDA | 9.40 | 4.50 | 7.00 | 3.20 | 1.10 | |
| | NPGDA | | | | | | |
| Multifunctional monomer | PEA | 28.30 | 33.20 | 30.30 | 34.50 | 36.60 | 37.97 |
| | IBOA | 20.00 | 19.00 | 20.00 | 19.00 | 19.00 | 18.75 |
| | VCL | 13.40 | 13.40 | 13.40 | 13.40 | 13.40 | 13.40 |
| Oligomer | CN963B80 | 3.80 | 3.80 | 3.80 | 3.80 | 3.80 | 3.80 |
| | CN2003EU | | | | | | |
| Photoinitiating system | TPO | 5.50 | 5.50 | 5.50 | 5.50 | 5.50 | 5.50 |
| | ITX | 3.00 | 3.00 | 3.00 | 3.00 | 3.00 | 3.00 |
| | CN3755 | 5.50 | 5.50 | 5.50 | 5.50 | 5.50 | 5.50 |
| Surfactant | KF6038 | | | | | | |
| | SILJ208 | 1.00 | 1.00 | 1.00 | 1.00 | 1.00 | 1.00 |
| Stabilizer | UV10 | | | | | | |
| | STABI | 0.90 | 0.90 | 0.90 | 0.90 | 0.90 | 0.90 |
| Total | | 100.00 | 100.00 | 100.00 | 100.00 | 100.00 | 100.00 |

| Table of Black Inkjet inks | | | | | | | | | | |
|---|---|---|---|---|---|---|---|---|---|---|
| Component | wt % of: | K1 | K2 | K3 | K4 | K5 | K6 | K7 | K8 | K9 |
| Pigment Dispersion | CPK1 | 7.72 | 7.72 | 7.72 | 7.72 | 7.72 | 7.72 | 7.72 | 7.72 | 7.72 |
| Multifunctional monomer | TCDDA | | | | | | | | | |
| | NPGDA | 2.68 | | | | | 5.48 | 2.68 | 2.68 | 5.18 |
| Multifunctional monomer | PEA | 27.81 | 27.59 | 27.59 | 27.59 | 32.19 | 31.41 | 31.51 | 37.26 | 37.51 |
| | IBOA | 27.60 | 30.50 | 30.50 | 30.50 | 25.90 | 24.00 | 22.90 | 18.15 | 15.40 |
| | VCL | 13.20 | 13.20 | 13.20 | 13.20 | 13.20 | 13.20 | 13.20 | 13.20 | 13.20 |
| | AMCO | | | | | | | | | |
| Oligomer | CN963B80 | 5.40 | 5.40 | 5.40 | 5.40 | 5.40 | | 5.40 | 5.40 | 5.40 |
| | CN2003EU | | | | | | 2.60 | | | |
| Photoinitiating system | TPO | 5.25 | 5.25 | 5.25 | 5.25 | 5.25 | 5.25 | 5.25 | 5.25 | 5.25 |
| | ITX | 2.50 | 2.50 | 2.50 | 2.50 | 2.50 | 2.50 | 2.50 | 2.50 | 2.50 |
| | CN3755 | 6.00 | 6.00 | 6.00 | 6.00 | 6.00 | 6.00 | 6.00 | 6.00 | 6.00 |
| Surfactant | KF6038 | 0.70 | 0.70 | 0.70 | 0.70 | 0.70 | 0.70 | 0.70 | 0.70 | 0.70 |
| | SILJ208 | | | | | | | | | |
| Stabilizer | UV10 | 0.30 | 0.30 | 0.30 | 0.30 | 0.30 | 0.30 | 0.30 | 0.30 | 0.30 |
| | STABI | 0.84 | 0.84 | 0.84 | 0.84 | 0.84 | 0.84 | 0.84 | 0.84 | 0.84 |
| Total | | 100.00 | 100.00 | 100.00 | 100.00 | 100.00 | 100.00 | 100.00 | 100.00 | 100.00 |

| Component | wt % of: | K10 | K11 | K12 | K13 | K14 | K15 |
|---|---|---|---|---|---|---|---|
| Pigment Dispersion | CPK1 | 7.72 | 7.72 | 7.72 | 7.72 | 7.72 | 7.72 |
| Multifunctional monomer | TCDDA | 8.00 | 4.00 | 6.40 | 2.75 | 1.00 | |
| | NPGDA | | | | | | |

| | | Table of Black Inkjet inks | | | | | | |
|---|---|---|---|---|---|---|---|---|
| | Multifunctional monomer | PEA | 30.54 | 35.14 | 31.74 | 36.39 | 38.14 | 40.09 |
| | | IBOA | 20.00 | 18.75 | 20.00 | 18.75 | 18.75 | 18.00 |
| | | VCL | 13.40 | 13.40 | 13.40 | 13.40 | 13.40 | 13.20 |
| | | ACMO | | | | | | |
| | Oligomer | CN963B80 | 4.75 | 5.40 | 5.15 | 5.40 | 5.40 | 5.40 |
| | | CN2003EU | | | | | | |
| | Photoinitiating system | TPO | 5.25 | 5.25 | 5.25 | 5.25 | 5.25 | 5.25 |
| | | ITX | 2.50 | 2.50 | 2.50 | 2.50 | 2.50 | 2.50 |
| | | CN3755 | 6.00 | 6.00 | 6.00 | 6.00 | 6.00 | 6.00 |
| | Surfactant | KF6038 | | | | | | |
| | | SILJ208 | 1.00 | 1.00 | 1.00 | 1.00 | 1.00 | 1.00 |
| | Stabilizer | UV10 | | | | | | |
| | | STABI | 0.84 | 0.84 | 0.84 | 0.84 | 0.84 | 0.84 |
| | Total | | 100.00 | 100.00 | 100.00 | 100.00 | 100.00 | 100.00 |

| | | Overview Table | | | | | | | | |
|---|---|---|---|---|---|---|---|---|---|---|
| Cyan Ink | wt % of | C1 | C2 | C3 | C4 | C5 | C6 | C7 | C8 | C9 |
| | PEA | 32.3 | 32.0 | 32.3 | 31.7 | 36.4 | 35.8 | 37.0 | 41.8 | 42.0 |
| | IBOA | 27.4 | 30.7 | 30.4 | 31.0 | 26.4 | 23.9 | 22.8 | 17.9 | 15.2 |
| | VCL + ACMO | 13.4 | 13.4 | 13.4 | 13.4 | 13.4 | 13.4 | 13.4 | 13.4 | 13.4 |
| | MULTI + OLIGO | 8.1 | 5.1 | 5.1 | 5.1 | 5.1 | 8.1 | 8.1 | 8.1 | 10.6 |
| Magenta ink | wt % of | M1 | M2 | M3 | M4 | M5 | M6 | M7 | M8 | M9 |
| | PEA | 31.7 | 32.6 | 34.3 | 29.0 | 33.6 | 36.1 | 36.3 | 41.0 | 41.2 |
| | IBOA | 27.3 | 29.4 | 27.7 | 33.0 | 28.5 | 22.9 | 22.7 | 18.0 | 15.3 |
| | VCL + ACMO | 12.7 | 12.7 | 12.7 | 12.7 | 12.7 | 12.7 | 12.7 | 12.7 | 12.7 |
| | MULTI + OLIGO | 8.9 | 5.9 | 5.9 | 5.9 | 5.9 | 8.9 | 8.9 | 8.9 | 11.4 |
| Yellow ink | wt % of | Y1 | Y2 | Y3 | Y4 | Y5 | Y6 | Y7 | Y8 | Y9 |
| | PEA | 32.7 | 32.4 | 33.4 | 31.6 | 36.2 | 37.0 | 37.3 | 42.0 | 42.3 |
| | IBOA | 26.2 | 29.5 | 28.5 | 30.3 | 25.7 | 21.9 | 21.6 | 16.8 | 14.1 |
| | VCL + ACMO | 13.4 | 13.4 | 13.4 | 13.4 | 13.4 | 13.4 | 13.4 | 13.4 | 13.4 |
| | MULTI + OLIGO | 8.4 | 5.4 | 5.4 | 5.4 | 5.4 | 8.4 | 8.4 | 8.4 | 10.9 |
| Black ink | wt % of | K1 | K2 | K3 | K4 | K5 | K6 | K7 | K8 | K9 |
| | PEA | 32.6 | 32.4 | 32.4 | 32.4 | 37.0 | 36.2 | 36.3 | 42.0 | 42.3 |
| | IBOA | 27.6 | 30.5 | 30.5 | 30.5 | 25.9 | 24.0 | 22.9 | 18.2 | 15.4 |
| | VCL + ACMO | 13.2 | 13.2 | 13.2 | 13.2 | 13.2 | 13.2 | 13.2 | 13.2 | 13.2 |
| | MULTI + OLIGO | 8.1 | 5.5 | 5.5 | 5.5 | 5.5 | 8.1 | 8.1 | 8.1 | 10.6 |
| Ink set | wt % of | INV-1 | INV-2 | INV-3 | INV-4 | INV-5 | INV-6 | COMP-1 | COMP-2 | COMP-3 |
| | PEA | 32.3 | 32.4 | 33.1 | 31.2 | 35.8 | 36.3 | 36.7 | 41.7 | 42.0 |
| | IBOA | 27.1 | 30.0 | 29.3 | 31.2 | 26.6 | 23.2 | 22.5 | 17.7 | 15.0 |
| | VCL + ACMO | 13.2 | 13.2 | 13.2 | 13.2 | 13.2 | 13.2 | 13.2 | 13.2 | 13.2 |
| | MULTI + OLIGO | 8.4 | 5.5 | 5.5 | 5.5 | 5.5 | 8.4 | 8.4 | 8.4 | 10.9 |

| | | | | | | | |
|---|---|---|---|---|---|---|---|
| Cyan Ink | wt % of | C10 | C11 | C12 | C13 | C14 | C15 |
| | PEA | 32.9 | 37.8 | 33.3 | 39.8 | 42.5 | 45.5 |
| | IBOA | 18.3 | 17.4 | 17.9 | 17.4 | 16.0 | 15.5 |
| | VCL + ACMO | 13.4 | 13.4 | 13.4 | 13.4 | 12.0 | 11.5 |
| | MULTI + OLIGO | 13.8 | 12.8 | 16.8 | 10.8 | 10.8 | 9.8 |
| Magenta ink | wt % of | M10 | M11 | M12 | M13 | M14 | M15 |
| | PEA | 30.9 | 37.8 | 32.9 | 39.6 | 42.9 | 44.1 |
| | IBOA | 22.0 | 22.4 | 25.3 | 22.5 | 22.3 | 22.3 |
| | VCL + ACMO | 16.7 | 13.4 | 13.4 | 13.4 | 13.4 | 12.0 |
| | MULTI + OLIGO | 11.2 | 7.2 | 9.2 | 5.2 | 2.2 | 2.4 |
| Yellow ink | wt % of | Y10 | Y11 | Y12 | Y13 | Y14 | Y15 |
| | PEA | 35.0 | 39.9 | 37.0 | 41.2 | 43.3 | 44.7 |
| | IBOA | 20.0 | 19.0 | 20.0 | 19.0 | 19.0 | 18.8 |
| | VCL + ACMO | 13.4 | 13.4 | 13.4 | 13.4 | 13.4 | 13.4 |
| | MULTI + OLIGO | 12.3 | 8.4 | 10.3 | 7.1 | 5.0 | 3.9 |
| Black ink | wt % of | K10 | K11 | K12 | K13 | K14 | K15 |
| | PEA | 35.3 | 39.9 | 36.5 | 41.2 | 42.9 | 44.9 |
| | IBOA | 20.0 | 18.8 | 20.0 | 18.8 | 18.8 | 18.0 |
| | VCL + ACMO | 13.4 | 13.4 | 13.4 | 13.4 | 13.4 | 13.2 |
| | MULTI + OLIGO | 12.8 | 9.5 | 11.6 | 8.2 | 6.5 | 5.5 |
| Ink set | wt % of | COMP-4 | COMP-5 | COMP-6 | COMP-7 | COMP-8 | COMP-9 |
| | PEA | 33.5 | 38.8 | 34.9 | 40.4 | 42.9 | 44.5 |
| | IBOA | 20.1 | 19.4 | 20.8 | 19.4 | 19.0 | 18.6 |
| | VCL + ACMO | 15.0 | 13.4 | 13.4 | 13.4 | 13.1 | 12.5 |
| | MULTI + OLIGO | 12.5 | 9.5 | 12.0 | 7.8 | 6.1 | 5.4 |

The overview table shows the average values for wt % of the polymerizable compounds calculated for the ink set from the wt % of respectively PEA, IBOA, VCL and ACMO, and multifunctional monomer and oligomer (MULTI+OLIGO) present in the cyan, magenta, yellow and black inks. As an example, the ink M4 has a deviation of 1.0 wt % from the IBOA range, but on average the ink set INV-4 has an IBOA content within the claimed range.

Evaluation and Results

The viscosity for all inkjet inks was determined and found to be between 9 and 12 mPa·s at 45° C.

The surface tension for all inkjet inks was determined and found to be between 22 and 30 mN/m at 25° C. for all inkjet inks.

The radiation curable inkjet ink sets INV-1 to INV-6 and COMP-1 to COMP-9 were tested for adhesion on 7 different substrates and tested for stickiness.

For each substrate, the sum of the adhesion scores for the 8 colour squares of Table 2 was made and is shown in Table 9. The column headed by "ALL" shows the sum of the adhesion scores of the 7 tested substrates.

TABLE 9

| Ink set | Adhesion | | | | | | | Stickyness |
|---|---|---|---|---|---|---|---|---|
| | PP1 | PP2 | PVC | PC | PMMA | PS | ALL | |
| INV-1 | 0 | 0 | 1 | 0 | 9 | 4 | 14 | 3 |
| INV-2 | 1 | 1 | 0 | 0 | 4 | 0 | 6 | 2 |
| INV-3 | 1 | 1 | 1 | 0 | 5 | 1 | 9 | 0 |
| INV-4 | 0 | 1 | 1 | 0 | 4 | 0 | 6 | 1 |
| INV-5 | 1 | 0 | 0 | 0 | 2 | 1 | 4 | 0 |
| INV-6 | 1 | 3 | 1 | 0 | 3 | 0 | 8 | 2 |
| COMP-1 | 0 | 0 | 0 | 0 | 7 | 0 | 7 | 5 |
| COMP-2 | 13 | 3 | 0 | 0 | 3 | 5 | 24 | 4 |
| COMP-3 | 12 | 12 | 6 | 0 | 3 | 5 | 38 | 5 |
| COMP-4 | 0 | 1 | 0 | 1 | 7 | 13 | 22 | 1 |
| COMP-5 | 0 | 5 | 0 | 0 | 4 | 0 | 9 | 4 |
| COMP-6 | 3 | 0 | 0 | 0 | 4 | 16 | 23 | 1 |
| COMP-7 | 2 | 0 | 0 | 0 | 4 | 4 | 10 | 4 |
| COMP-8 | 1 | 1 | 0 | 0 | 5 | 0 | 7 | 5 |
| COMP-9 | 1 | 0 | 0 | 0 | 2 | 0 | 3 | 5 |

It should be clear that only the radiation curable inkjet ink sets INV-1 to INV-6 deliver printed substrates exhibiting simultaneously good adhesion and low stickiness. All ink sets exhibited good curing speed as all substrates were printed at standard settings by an Anapurna™ H2050i LED inkjet system available from AGFA NV.

Example

This example illustrates a radiation curable CMYK inkjet ink set further light cyan (LC), light magenta (LM) and light black (LK) inkjet inks.

Preparation of Inkjet Inks

The UV curable inkjet inks were prepared by mixing the components as shown in Table 10 here below. The wt % is based on the total weight of the inkjet ink. The same concentrated pigment dispersions were used as prepared in Example 1.

TABLE 10

| Component | wt % of: | C | M | Y | K | LC | LM | LK |
|---|---|---|---|---|---|---|---|---|
| Pigment Dispersions | CPC1 | 7.20 | | | | 2.79 | | |
| | CPM1 | | 18.52 | | | | 5.00 | |
| | CPY1 | | | 10.20 | | | | |
| | CPK1 | | | | 10.84 | | | 0.98 |
| Multifunctional monomer | MPDA | | 4.80 | 0.60 | 0.70 | | 1.30 | |
| | TCDDA | 3.50 | | | | | | |
| Monofunctional monomer | PEA | 25.00 | 24.12 | 30.95 | 31.48 | 34.60 | 34.75 | 37.74 |
| | IBOA | 27.00 | 26.30 | 25.65 | 25.85 | 25.59 | 25.80 | 25.30 |
| | VCL | | 13.40 | 13.40 | 13.20 | 13.40 | 13.40 | 13.40 |
| | VMOX | 10.85 | | | | | | |
| Other polymerizable compounds | TCDA | 6.17 | | | | | | |
| | IDA | | | | | 1.40 | | |
| Oligomer | CN963B80 | 4.50 | | 4.20 | 5.80 | 8.45 | 6.20 | 7.50 |
| Photoinitiating system | ITX | | | 2.00 | 1.00 | | | 0.50 |
| | TPO | 7.35 | 8.00 | 6.50 | 6.75 | 8.50 | 8.00 | 8.50 |
| | CN3755 | 6.20 | 2.95 | 4.50 | 2.50 | 3.20 | 3.50 | 4.00 |
| Surfactant | C7500 | 1.00 | | | | | | |
| | KF6038 | | 0.80 | 0.80 | 0.80 | 0.80 | 0.80 | 0.80 |
| Stabilizer | UV10 | 0.30 | 0.30 | 0.30 | 0.30 | 0.30 | 0.30 | 0.30 |
| | STABI | 0.93 | 0.81 | 0.90 | 0.78 | 0.97 | 0.95 | 0.98 |
| Total = | | 100.00 | 100.00 | 100.00 | 100.00 | 100.00 | 100.00 | 100.00 |

Evaluation and Results

The surface tension and the viscosity at 45° C. was determined for each of the inkjet inks.

TABLE 11

| Inkjet Ink | Surface Tension (mN · m) | Viscosity (mPa · s) |
|---|---|---|
| C | 29.6 | 10.8 |
| M | 23.4 | 8.5 |
| Y | 23.8 | 8.8 |
| K | 23.5 | 8.7 |
| LC | 23.4 | 9.1 |
| LM | 24.3 | 9.5 |
| LK | 23.6 | 8.5 |

The adhesion and stickiness was determined for a multi-colour image printed with an Anapurna™ H2050i LED on a propylene substrate PP1 and on a polymethylmethacrylate substrate PMMA. The scores for adhesion and stickiness were in all cases excellent (0).

The invention claimed is:

1. A radiation curable inkjet ink set comprising:
   (i) a cyan inkjet ink containing a beta-copper phthalocyanine pigment and a polymerizable composition;
   (ii) a magenta inkjet ink containing a magenta or red pigment and a polymerizable composition;
   (iii) a yellow inkjet ink containing a yellow pigment and a polymerizable composition; and
   (iv) a black inkjet ink containing a carbon black pigment and a polymerizable composition;

wherein the polymerizable compositions of the cyan, magenta, yellow and black inkjet inks consist of on average:
a) 20.0 to 40.0 wt % of phenoxyethyl acrylate;
b) 23.0 to 32.0 wt % of isobornyl acrylate;
c) 1.0 to 14.4 wt % of monomer selected from the group consisting of 4-acryloylmorpholine and a monomer according to Formula (I):

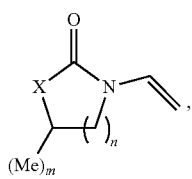

wherein X represents C or O, n represents 1, 2 or 3 and m represents 0 or 1;
d) up to 14.0 wt % of a multifunctional monomer or oligomer;
e) no more than 15 wt % of other polymerizable compounds based upon the total weight of the inkjet ink;
f) optionally one or more polymerization initiators;
g) optionally a co-initiator; and
h) optionally a polymerizable surfactant,
wherein all weight percentages (wt %) are based upon the total weight of the inkjet ink;
wherein 0, 1, or 2 of the cyan, magenta, yellow and black inkjet inks deviate in a range a) to d) and this deviation is no more than 1.0 wt %;
wherein the multifunctional monomer or oligomer is selected from the group consisting of vinylether acrylates, triethylene glycol diacrylate, tetraethylene glycol diacrylate, polyethylene glycol diacrylate, dipropylene glycol diacrylate, tripropylene glycol diacrylate, polypropylene glycol diacrylate, 1,4-butanediol diacrylate, 1,6-hexanediol diacrylate, 3-methyl-1,6-pentanediyl diacrylate, neopentyl glycol diacrylate, dimethylol-tricyclodecane diacrylate, bisphenol A EO (ethylene oxide) adduct diacrylate, bisphenol A PO (propylene oxide) adduct diacrylate, hydroxypivalate neopentyl glycol diacrylate, propoxylated neopentyl glycol diacrylate, alkoxylated dimethyloltricyclodecane diacrylate and polytetramethylene glycol diacrylate, trimethylolpropane triacrylate, EO modified trimethylolpropane triacrylate, tri (propylene glycol) triacrylate, caprolactone modified trimethylolpropane triacrylate, pentaerythritol triacrylate, pentaerithritol tetraacrylate, pentaerythritolethoxy tetraacrylate, dipentaerythritol hexaacrylate, ditrimethylolpropane tetraacrylate glycerinpropoxy triacrylate, caprolactam modified dipentaerythritol hexaacrylate, alkoxylated cyclohexanone dimethanol diacrylate, alkoxylated hexanediol diacrylate, dioxane glycol diacrylate, dioxane glycol diacrylate, cyclohexanone dimethanol diacrylate, diethylene glycol diacrylate, propoxylated glycerine triacrylate, propoxylated trimethylolpropane triacrylate, di-trimethylolpropane tetraacrylate, dipentaerythritol pentaacrylate, ethoxylated pentaeryhtritol tetraacrylate, multifunctional methoxylated glycol acrylates, epoxy acrylate oligomers, aliphatic urethane acrylate oligomers, aromatic urethane acrylate oligomers, polyester acrylate oligomers, and straight-chained acrylic oligomers; and
wherein the other polymerizable compounds are any other monomer and oligomer having a single polymerizable group capable of free radical polymerization.

2. The inkjet ink set of claim 1, wherein the monomer according to Formula (I) is present in an amount of 7.0 to 14.0 wt % based on the total weight of the inkjet ink.

3. The inkjet ink set of claim 1, wherein the polymerizable compositions contain 33.0 to 38.0 wt % of phenoxyethyl acrylate based on the total weight of the inkjet ink.

4. The inkjet ink set of claim 1, wherein the monomer according to Formula (I) is N-vinyl caprolactam or N-vinyl methyl oxazolidinone.

5. The inkjet ink set of claim 1, wherein the cyan, magenta, yellow and black inkjet inks include the one or more polymerization initiators selected from the group consisting of an acylphosphine oxide compound, a thioxanthone compound, and an α-hydroxy ketone compound.

6. The inkjet ink set of claim 1, wherein the one or more polymerization initiators include at least 5.0 wt % of an acylphosphine oxide compound based on the total weight of the inkjet ink.

7. The inkjet ink set of claim 5, wherein the cyan or magenta inkjet ink include 0 to 3.0 wt % of a thioxanthone compound based on the total weight of the inkjet ink.

8. The inkjet ink set of claim 1, wherein the yellow pigment selected from the group consisting of C.I. Pigment Yellow 120, 138, 139, 150, 155, 185, and 213, and mixed crystals thereof.

9. The inkjet ink set of claim 1, wherein the magenta or red pigment selected from the group consisting of a quinacridone, a diketopyrrolopyrrole pigment, and mixed crystals, or mixtures thereof.

10. The inkjet ink set of claim 9, wherein the magenta or red pigment is selected from C.I. Pigment Red 122, C.I. Pigment Red 202, C.I. Pigment Violet 19, C.I. Pigment Red 254, and mixed crystals thereof.

11. A substrate printed with inkjet inks from an inkjet ink set as claimed in claim 1.

12. The printed substrate of claim 11, wherein the substrate is selected from the group consisting of a polypropylene substrate and a polymethylmethacrylate substrate.

13. An inkjet printing method comprising the steps of:
jetting inkjet inks of the inkjet ink set as claimed in claim 1 on a substrate; and
UV curing the inkjet inks on the substrate by a UV light-emitting diode having an emission peak wavelength in a range of 350 to 420 nm.

14. The inkjet printing method of claim 13, wherein the substrate is selected from the group consisting of a polypropylene substrate and a polymethylmethacrylate substrate.

* * * * *